(12) United States Patent
Sasai et al.

(10) Patent No.: US 8,059,203 B2
(45) Date of Patent: Nov. 15, 2011

(54) MOVING PICTURE PROCESSING METHOD

(75) Inventors: Hisao Sasai, Sherman Oaks, CA (US); Satoshi Kondo, Kyoto (JP)

(73) Assignee: Panasonic Corporation, Osaka (JP)

(*) Notice: Subject to any disclaimer, the term of this patent is extended or adjusted under 35 U.S.C. 154(b) by 1148 days.

(21) Appl. No.: 11/795,839

(22) PCT Filed: Feb. 13, 2006

(86) PCT No.: PCT/JP2006/302458
§ 371 (c)(1),
(2), (4) Date: Jul. 23, 2007

(87) PCT Pub. No.: WO2006/087989
PCT Pub. Date: Aug. 24, 2006

(65) Prior Publication Data
US 2008/0030617 A1 Feb. 7, 2008

(30) Foreign Application Priority Data

Feb. 21, 2005 (JP) ................................. 2005-044761
Apr. 28, 2005 (JP) ................................. 2005-133065

(51) Int. Cl.
*H04N 1/387* (2006.01)
*H04N 5/21* (2006.01)

(52) U.S. Cl. ........ 348/622; 348/607; 348/578; 348/700; 348/598; 382/275

(58) Field of Classification Search .................. 348/607, 348/606, 610, 578, 622, 700, 598; 382/275, 382/236; 375/240.01, 240.16, 240.29; 345/629, 345/630, 632
See application file for complete search history.

(56) References Cited

U.S. PATENT DOCUMENTS 4,807,029 A 2/1989 Tanaka
5,136,615 A 8/1992 Tanoi
(Continued)

FOREIGN PATENT DOCUMENTS

JP 62-295583 12/1987
(Continued)

OTHER PUBLICATIONS

Supplementary European Search Report (in English language) issued Dec. 4, 2008 in European Application No. 06713600.2.
(Continued)

*Primary Examiner* — Jefferey Harold
*Assistant Examiner* — Jean W Desir
(74) *Attorney, Agent, or Firm* — Wenderoth, Lind & Ponack, L.L.P.

(57) ABSTRACT

Provided is a moving picture processing method which prevents degradation of subjective image quality caused by a motion of a moving picture. The moving picture processing method includes the following steps: a motion compensation step (S116) of shifting a noise indicated by a stored noise signal (FMN) according to a motion of a moving picture indicated by an input image signal (VIN), by performing motion compensation on the stored noise signal (FMN) that is used for superimposition on a picture indicated by an input image signal (VIN) and is stored in a noise frame memory (102); and a superimposition step (S120) of superimposing the shifted noise, as a superimposition noise signal SN, onto a current picture to be processed which is indicated by an input image signal (VIN) and is a moving picture that appears after the motion has occurred.

15 Claims, 26 Drawing Sheets

U.S. PATENT DOCUMENTS

| | | | |
|---|---|---|---|
| 5,229,864 | A | 7/1993 | Moronaga et al. |
| 6,587,509 | B1 | 7/2003 | Suzuki et al. |
| 6,717,613 | B1 | 4/2004 | Osa |
| 7,245,783 | B2 * | 7/2007 | Fielding ............... 382/275 |

FOREIGN PATENT DOCUMENTS

| | | |
|---|---|---|
| JP | 3-210889 | 9/1991 |
| JP | 4-2275 | 1/1992 |
| JP | 7-95562 | 4/1995 |
| JP | 8-79765 | 3/1996 |
| JP | 8-149466 | 6/1996 |
| JP | 8-163594 | 6/1996 |

OTHER PUBLICATIONS

J.M. Boyce et al., "*Comfort Noise for Compressed Video*", Consumer Electronics, 2005. ICCE. 2005 Digest of Technical Papers. International Conference on Las Vegas, NV, USA Jan. 8-12, 2005, Pistcataway, NJ, USA, IEEE, Jan. 8, 2005, pp. 323-324, XP010796662.

M.K.N. Schoyer et al., "*Block Position Dithering in DCT-coded Sequences*", Signal Processing. Image Communication, Elsevier Science Publishers, Amsterdam, NL, vol. 8, No. 6, Sep. 1, 1996, pp. 545-549, XP004047116.

* cited by examiner

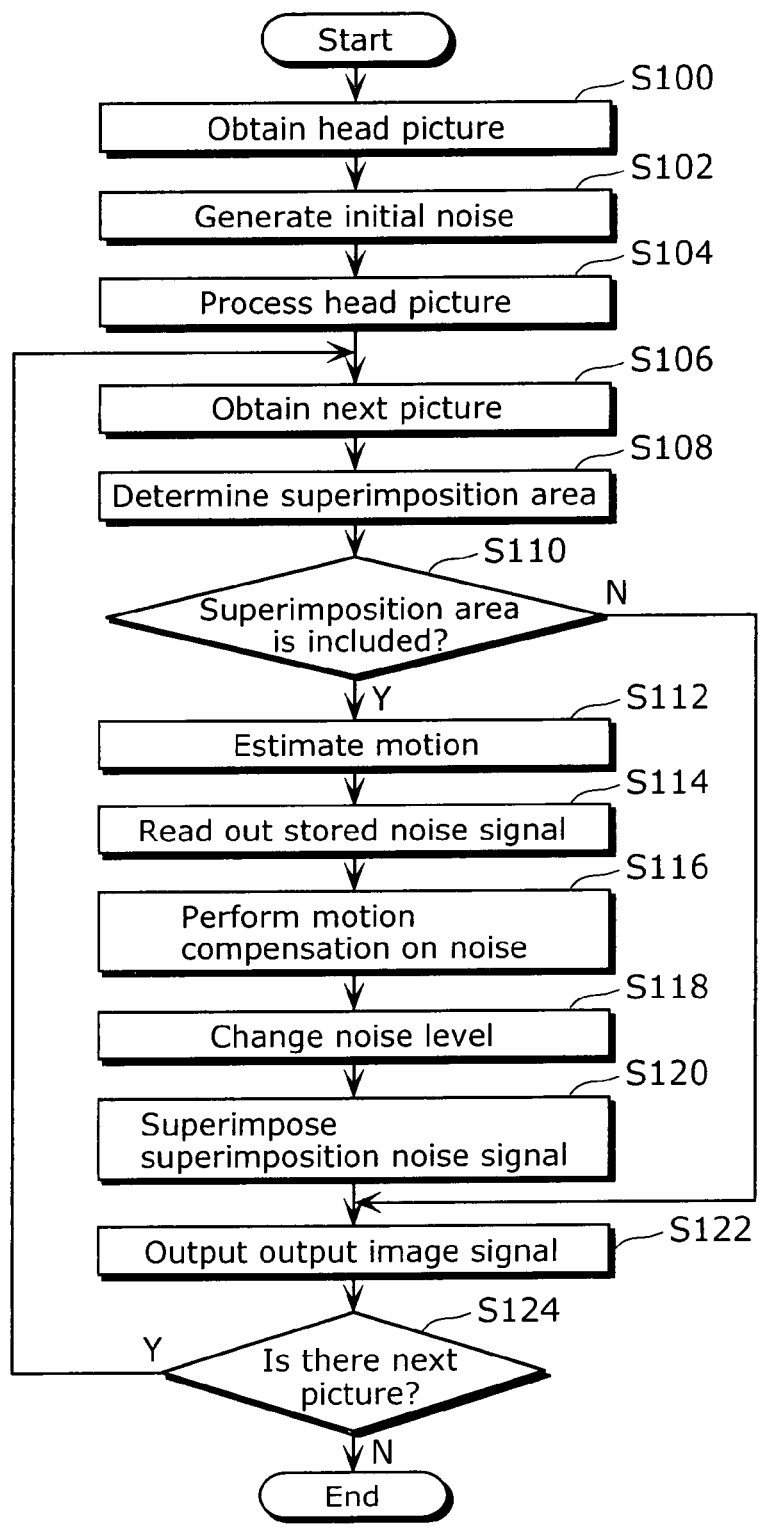

MOVING PICTURE PROCESSING METHOD

TECHNICAL FIELD

The present invention relates to a moving picture processing method for superimposing noises on a moving picture.

BACKGROUND ART

A moving picture coding is known as a technology for coding a moving picture at a low bit rate and transmitting the coded moving picture, in a TV, a personal computer (PC), a cell phone or any other apparatus to display a moving picture.

With the moving picture coding technology as mentioned above, high frequency components included in a moving picture are removed when the moving picture is coded. Therefore, in the case where a moving picture presents meticulous patterns or the like, and coding and decoding are performed on that moving picture, the patterns may be lost in some cases.

A moving picture processing method for presenting noises as such meticulous patterns originally included in the moving picture by superimposing the removed high frequency components as noises on the decoded moving picture has been suggested (see Patent Reference 1).

According to the moving picture processing method of Patent Reference 1, an amount of noise to be added is determined using a parameter added to a bit stream representing a coded moving picture, and the noise is added as white noise to a decoded picture.

Thus, the moving picture processing method of Patent Reference 1 gives an impression to the viewers that the pictures are of high quality by superimposing noises.

Patent Reference 1: Japanese Laid-Open Patent Application No. 08-79765.

DISCLOSURE OF INVENTION

Problems that Invention is to Solve

However, the problem with the moving picture processing method of Patent Reference 1 is that the image quality subjectively perceived by the viewers (hereinafter referred to as "subjective image quality") is deteriorated by a movement of a moving picture.

In other words, the moving picture processing method according to Patent Reference 1 may destroy the correlativity between a moving picture and noise in temporal direction. If a movement of a moving picture is different from a movement of noise, the superimposed noise is to be perceived as noise that only deteriorates its image quality, but not as the pattern appearing in the moving picture.

The present invention is therefore conceived in view of the above-mentioned problem, and an object of the present invention is to provide a moving picture processing method which prevents the deterioration of subjective image quality caused by the movement of a moving picture.

Means to Solve the Problems

In order to achieve the object as stated above, the moving picture processing method of the present invention is a moving picture processing method for superimposing noise on a moving picture and includes: shifting a first noise which has been used for superimposition on a moving picture, in accordance with a movement of the moving picture; and superimposing the shifted first noise onto a moving picture that appears after the motion has occurred.

Thus, the first noise superimposed on a moving picture is shifted in accordance with the motion of the moving picture. In other words, the correlativity with regard to temporal direction between the moving picture and the noise can be maintained since motion compensation is performed. As a result, the viewer perceives the first noise as a meticulous pattern of an object that appears in the moving picture. Therefore, it is possible to prevent degradation in subjective image quality due to the motion of the moving picture, which is caused in the conventional technology.

According to the moving picture processing method, a superimposition area, on which noise is to be superimposed, may be specified in a current picture to be processed which is included in the moving picture. When the first noise is shifted, the first noise may be shifted in accordance with a motion of an image in the superimposition area. When the shifted first noise is superimposed, the shifted first noise may be superimposed onto the superimposition area. For example, when the superimposition area is specified, the superimposition area may be specified based on frequency components in the current picture.

Thus, noise is superimposed on a superimposition area within a picture so that it is possible to improve the quality of the picture by superimposing noise on an appropriate area instead of superimposing noise on the entire picture. For example, when a moving picture is coded and then decoded, a picture included in the decoded moving picture loses a meticulous pattern that appears in a natural object such as a mountain, after the high frequency components are removed. However, in the area which represents a mountain in the picture, a certain number of high frequency components remain, as compared with the other areas. With the present invention, the area in which high frequency components remain in a picture included in the moving picture is identified as a superimposition area, and therefore, it is possible to superimpose noise only on the mountain. Consequently, it is possible to improve the quality of the pictures.

When the first noise is shifted, the motion of the image may be estimated in the superimposition area, and the first noise may be shifted according to the estimated motion.

Thus, a motion vector of a superimposition area is estimated and the first noise is motion compensated according to the motion vector. It is therefore possible to properly maintain the correlativity with regard to temporal direction between the moving picture and the noise.

The moving picture processing method may further include obtaining a moving picture signal including the moving picture. When the first noise is shifted, motion information indicating the motion of the image in the superimposition area may be extracted from the moving picture signal, and the first noise may be shifted according to the motion indicated by the extracted motion information.

Thus, the first noise is motion compensated according to the motion indicated by the motion information extracted from a moving picture signal. Therefore, it is possible to omit the process of estimating the motion of the moving picture and to reduce the amount of processing.

The moving picture signal may be coded, and the method may further include decoding the coded moving picture signal. When the superimposition area is specified, the superimposition area may be sequentially specified in each of current pictures to be processed which is included in the decoded moving picture signal.

Thus, in the case where a coded moving picture signal is decoded, noise is superimposed on a decoded picture. Therefore, it is possible to compensate, with noise, the high frequency components lost through the coding of the moving picture signal, and thus to improve the quality of the pictures.

The moving picture signal may further include first identification information indicating the superimposition area, and when the superimposition area is specified, the superimposition area may be specified based on the first identification information.

Thus, a superimposition area is specified according to a noise flag which is the first identification information included in the moving picture signal. Therefore, it is possible to determine the superimposition area on the side of the apparatus which generates a moving picture signal and transmits it. As a result, the first noise can be superimposed onto an appropriate area.

The moving picture signal may further include second identification information indicating an area on which the first noise is to be superimposed within the superimposition area, and when the shifted first noise is superimposed, the shifted first noise may be superimposed on the area indicated by the second identification information.

Thus, a superimposition area to superimpose noise is specified according to the motion compensation flag which is the second identification information included in the moving picture signal. Therefore, it is possible to determine the superimposition area on the side of the apparatus which generates a moving picture signal and transmits it. Consequently, it is possible to superimpose the first noise on an appropriate area in the superimposition area. In addition, it is also possible to superimpose a new noise which has not been used for superimposition, onto the other areas within the superimposition area. This results in the improvement of the picture quality.

The moving picture signal may further include an adjustment signal indicating the level of the noise to be superimposed, and the shifted first noise is superimposed, the first noise may be adjusted so that the level of the shifted first noise becomes equal to the level indicated by the adjustment signal, and the adjusted first noise may be superimposed on the superimposition area.

Thus, the level of the first noise is adjusted according to the adjustment signal included in the moving picture signal. Therefore, it is possible to determine the level on the side of the apparatus which generates the moving picture signal and transmits it. As a result, it is possible to superimpose the first noise having an appropriate noise level.

The moving picture processing method may further include: judging whether or not switching of image has occurred between the current picture included in the moving picture and a processed picture; newly generating a second noise which has not been used for superimposition and superimposing the generated second noise on the current picture in the case where it is judged that the switching has occurred; and superimposing the shifted first noise on the superimposition area in the case where it is judged that the switching has not occurred. For example, in the case where it is judged that the switching has occurred, the second noise is generated and the generated second noise is superimposed on the current picture. Here, the second noise is of a type which is in accordance with a characteristic of the current picture.

Thus, in the case where a scene change which is a switching of images has occurred, a second noise that has not been used so far for superimposition is superimposed onto a current picture to be processed, without motion compensation being performed on the first noise. Therefore, it is possible to prevent noise as same as the noise which has been superimposed before the scene change from being superimposed onto a picture that appears after the scene change. Thus, a type of noise to be superimposed can be switched according to the scene change.

When the shifted first noise is superimposed, the level of the shifted first noise may be adjusted and the adjusted first noise may be superimposed on the superimposition area. For example, when the level of the shifted first noise is adjusted, the level of the shifted first noise is adjusted so that the higher the frequency components included in the superimposition area are, the higher the level of the shifted first noise becomes.

Thus, the level of the first noise is adjusted, which enables enhancement in the quality of the pictures.

The present invention can be applied to a moving picture coding method for coding a moving picture so that the moving picture may be processed through the moving picture processing method as described above.

In other words, the picture coding method according to the present invention is a picture coding method for coding a moving picture. The method may include: generating a coded picture signal by coding a moving picture; judging whether or not to perform motion compensation on the noise which has been used for superimposition on a moving picture; and adding, to the coded picture signal, the first identification information which indicates the result of the judgment regarding the motion compensation.

Thus, the picture decoding apparatus which has obtained a coded picture signal can decode the coded picture signal as well as perform motion compensation on the noise which has been used for superimposition on a moving picture according to the motion compensation flag which is the first identification information added to the coded picture signal. In other words, the picture decoding apparatus can shift the noise used for the superimposition on a decoded moving picture according to the motion of the moving picture, and superimpose the shifted noise onto a moving picture that appears after the motion has occurred. As a result, with the picture decoding apparatus, the correlativity with regard to temporal direction between a decoded moving picture and noise can be maintained, and the viewer perceives the noise as a meticulous pattern of an object that appears in the moving picture. Therefore, it is possible to prevent degradation of subjective image quality due to the motion of the moving picture, which is caused by the conventional technology.

The picture coding method may further include: specifying a superimposition area to superimpose noise according to the characteristics of a picture, in a current picture to be coded which is included in the moving picture; and adding, to the coded picture signal, second identification information indicating the specified superimposition area.

Thus, the picture decoding apparatus which has obtained a coded picture signal can decode the coded picture signal as well as superimpose noise onto a superimposition area indicated by the noise flag which is the second identification information added to the coded picture signal. Consequently, it is possible to superimpose noise onto an appropriate area and improve the quality of the pictures.

The picture coding method may further include: generating a decoded moving picture by decoding the coded picture signal; judging whether or not to perform motion compensation based on the movement of a decoded moving picture; and specifying the superimposition area according to the characteristics of an image in the decoded moving picture.

Thus, the picture decoding apparatus can perform, in a more appropriate manner, motion compensation on noise in a more appropriate area.

Note that the present invention can be realized not only as the moving picture processing method and picture coding method as described above, but also as a moving picture processing apparatus, a picture coding apparatus, a picture decoding apparatus and an integrated circuit which performs processing based on such methods, or as a program for causing a computer to execute the processing based on the methods, and even as a storage medium which stores such a program.

Effects of the Invention

The moving picture processing method of the present invention produces an effect of enhancing the subjective image quality perceived by the viewers. In addition, it is possible to reduce the amount of processing load as well as the size of a circuit by using the method together with an apparatus, e.g., a digital TV, to decode a coded moving picture. Therefore, its practical value is high.

BRIEF DESCRIPTION OF DRAWINGS

FIG. 2 is a flowchart showing the operation of the moving picture processing apparatus according to the first embodiment.

| | Numerical References |
| --- | --- |
| 100 | Moving picture processing apparatus |
| 101 | Noise motion compensation unit |
| 102 | Noise frame memory |
| 104 | Adder |
| 105 | Initial noise generation unit |
| 106 | Motion estimation unit |
| FMN | Stored noise signal |
| MCN | Motion-compensated noise signal |
| MV | Motion information |
| N | Noise signal |
| SN | Superimposition noise signal |

BEST MODE FOR CARRYING OUT THE INVENTION

First Embodiment

The following describes the moving picture processing apparatus according to the first embodiment of the present invention.

Figure 1:
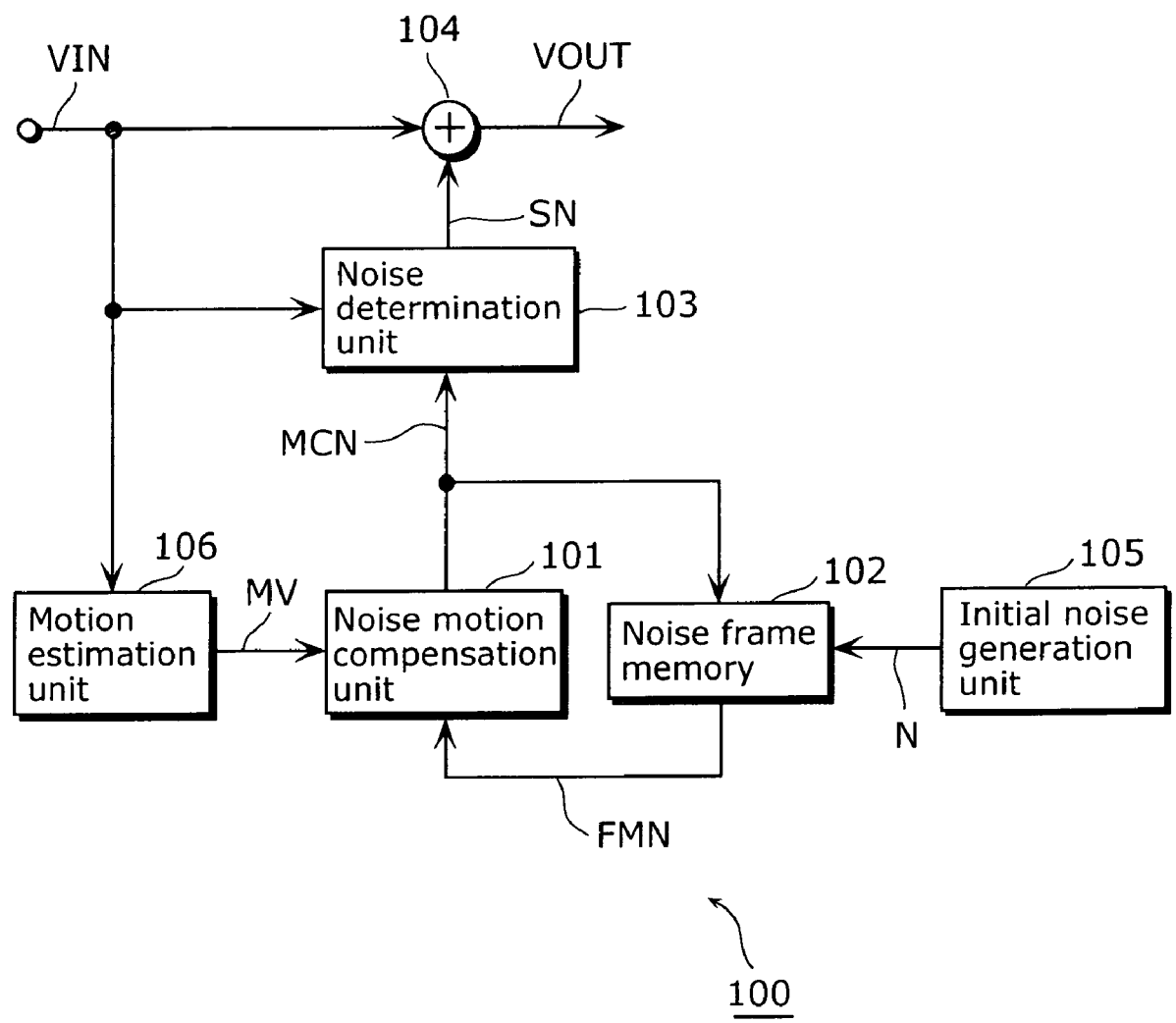
FIG. 1 is a block diagram showing a moving picture processing apparatus according to a first embodiment of the present invention.

FIG. 1 is a block diagram showing the moving picture processing apparatus according to the embodiment.

A moving picture processing apparatus 100 of the embodiment shifts noise according to a movement of an image indicated by an input image signal VIN, so as to superimpose the noise on the image. The moving picture processing apparatus 100 includes a noise motion compensation unit 101, a noise frame memory 102, a noise determination unit 103, an adder 104, an initial noise generation unit 105 and a motion estimation unit 106.

The initial noise generation unit 105 generates a noise signal N for superimposing noise on the input image signal VIN and outputs the noise signal N to the noise frame memory 102. The noise signal N is, for example, a noise signal which indicates previously-specified random noise. Also, the noise in the embodiment is an image such that gives an impression that the image is of high quality to the viewers through the superimposition of the noise on the input image signal VIN, and includes numerous high-frequency components.

The noise frame memory 102 stores the noise signal N outputted from the initial noise generation unit 105 and a motion-compensated noise signal MCN outputted from the noise motion compensation unit 101, as a stored noise signal FMN.

The motion estimation unit 106 obtains the input image signal VIN, estimates, per area such as a block unit and a macroblock unit, the motion of an image indicated by the input image signal VIN, and outputs the estimation result as motion information MV, e.g., a motion vector, to the noise motion compensation unit 101. Note that, by finding out an area that includes an image as same as or similar to an image in a current area to be processed (estimated) in the picture indicated by the input image signal VIN, from the previous picture which is different from that picture, the motion estimation unit 106 estimates the motion information MV of the current area.

The noise motion compensation unit 101 reads out, from the stored noise signals FMN stored in the noise frame memory 102, a stored noise signal FMN of the area indicated by the motion information MV as the motion-compensated noise signal MCN indicating the noise to be superimposed on the current area to be processed. Then, the noise motion compensation unit 101 outputs the motion-compensated noise signal MCN to the noise determination unit 103 and the noise frame memory 102. Thus, motion compensation is performed on the stored noise signal FMN. This means that the noise of the area indicated by the motion information MV is shifted to the current area to be processed. In other words, the noise is shifted according to the movement of the image.

The noise determination unit 103 obtains the input image signal VIN, specifies the characteristics such as the frequency of an image indicated by the input image signal VIN, and judges, per area such as a block, whether or not to superimpose noise onto an area. Specifically, the noise determination unit 103 determines a superimposition area to superimpose noise in the picture indicated by the input image signal VIN. In addition, the noise determination unit 103 adjusts the gain of the noise indicated by the motion-compensated noise signal MCN, based on the characteristics of the image specified as described above. The noise determination unit 103 then outputs the motion-compensated noise signal MCN whose gain has been adjusted, as a superimposition noise signal SN to the adder 104.

The adder 104 obtains the input image signal VIN and the superimposition noise signal SN, and superimposes the superimposition noise signal SN onto the input image signal VIN. That is to say that the adder 104 superimposes the noise indicated by the superimposition noise signal SN onto an image in the superimposition area, per superimposition area in the picture, which is indicated by the input image signal VIN. The adder 104 then outputs the input image signal VIN on which the superimposition noise signal SN has been superimposed, as an output image signal VOUT.

FIG. 2 is a flowchart showing the operation of the moving picture processing apparatus 100.

First, when the moving picture processing apparatus 100 obtains a head picture indicated by the input image signal VIN (Step S100), the initial noise generation unit 105 generates an initial noise signal N for the head picture, and causes the noise frame memory 102 to store the initial noise signal N (Step S102).

The moving picture processing apparatus 100 superimposes noise onto the head picture (Step S104). Specifically, the noise determination unit 103 obtains, via the noise motion compensation unit 101, the initial noise signal N stored in the noise frame memory 102, and also determines a superimposition area to superimpose noise in the head picture as well as the level of the noise. Moreover, the noise determination unit 103 performs gain adjustment for the noise signal N according to the determined level, and outputs the gain-adjusted noise signal N as a superimposition noise signal SN, for each determined superimposition area. Then, the adder 104 generates an output image signal VOUT by superimposing the noise indicated by the superimposition noise signal SN onto each superimposition area in the head picture, and outputs the generated output image signal VOUT.

Next, when the moving picture processing apparatus 100 obtains the next picture indicated by the input image signal VIN (Step S106), the noise determination unit 103 determines a superimposition area to superimpose noise in the next picture (Step S108). For example, the noise determination unit 103 specifies the frequency of each area in the picture indicated by the input image signal VIN. In the case where the frequency exceeds a predetermined value, the noise determination unit 103 determines that area as a superimposition area. In addition, the noise determination unit 103 determines the noise level of that area according to the amount of high-frequency components in the superimposition area. For instance, in the case where the amount of high-frequency components is small, the noise determination unit 103 determines the noise level to be low, and in the case where the amount of high-frequency components is large, the noise determination unit 103 determines the noise level to be high.

Then, the noise determination unit 103 judges whether or not the picture includes a superimposition area based on the result of the determination in Step S108 (Step S110). In the case of judging that the picture includes a superimposition area (Y in Step S110), the motion estimation unit 106 estimates the motion of an image in the superimposition area using that superimposition area and a picture which is temporally forward of the picture including the superimposition area (Step S112).

The noise motion compensation unit 101 reads out, from the noise frame memory 102, the stored noise signal FMN of the area indicated by the motion information MV indicating the result of the estimation in Step S112 (an area in the picture temporally forward of the picture that includes the superimposition area) (Step S114), performs motion compensation on the stored noise signal FMN, and generates a motion-compensated noise signal MCN for the superimposition area (Step S116). Specifically, the noise motion compensation unit 101 shifts the noise indicated by the stored noise signal FMN of the area in the temporally forward picture, which is used for superimposition on the moving picture, to the superimposition area described above.

Next, the noise determination unit 103 changes the noise level (performs gain adjustment) of the motion-compensated noise signal MCN so that the noise level of the motion-compensated noise signal MCN generated in Step S116 becomes equal to the noise level determined in Step S108, and outputs the superimposition noise signal SN whose noise level has been changed (Step S118).

Furthermore, the adder 104 superimposes the noise indicated by the superimposition noise signal SN onto the superimposition area, for each superimposition area determined in Step S108 (Step S120).

Then, when the superimposition is performed in Step S120, the adder 104 outputs the signal generated by superimposing the superimposition noise signal SN on the input image signal VIN, as the output image signal VOUT. When it is judged that the picture does not include a superimposition area in Step S110 (N in Step S110), the adder 104 outputs the input image signal VIN as an output image signal VOUT (Step S122).

Moreover, the moving picture processing apparatus 100 judges whether or not there is a picture which is to be processed next and is indicated by the input image signal VIN (Step S124). In the case of judging that there is such a picture (Y in Step S124), the moving picture processing apparatus 100 repeats executing the process starting from Step S106. In the case of judging that there is no picture to be processed (N in Step S124), the moving picture processing apparatus 100 terminates the processing of the moving picture.

Figure 3A:
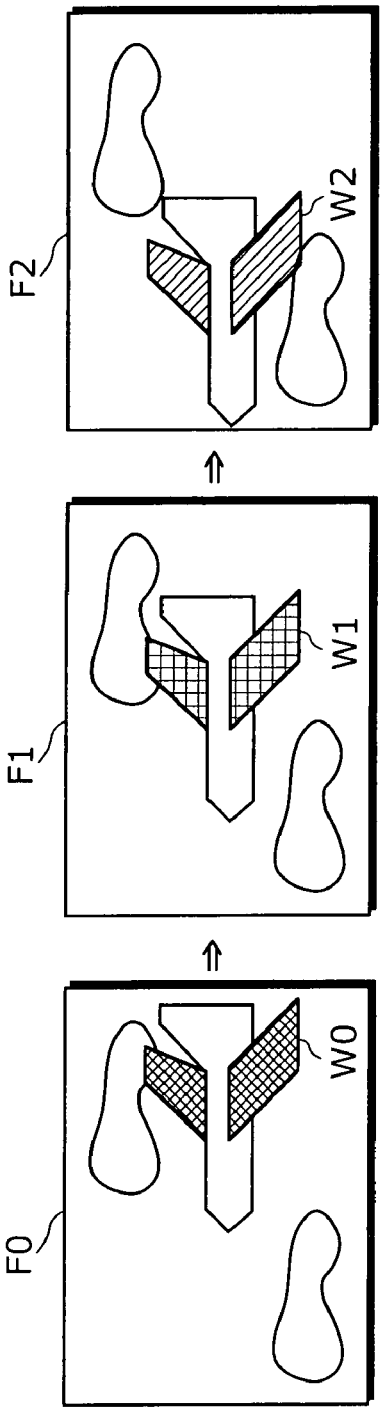
FIG. 3A is a diagram showing the pictures displayed in the case where motion compensation is not performed on noise.

FIG. 3A is a diagram showing the pictures displayed in the case where motion compensation is not performed on noise.

In the case where motion compensation is not performed on noise, noise is generated for superimposition areas W0, W1 and W2 in respective pictures F0, F1 and F2, and then, the generated noise is respectively superimposed on the superimposition areas W0, W1 and W2. In some cases, however, a different noise may be superimposed on each of the superimposition areas W0, W1 and W2 in the respective pictures F0, F1 and F2 depending on the picture. As a result, the viewer viewing these pictures F0, F1 and F2 as a moving picture may perceive the noise superimposed on each of the pictures as a flicker noise, which results in the deterioration of the subjective image quality.

Figure 3B:
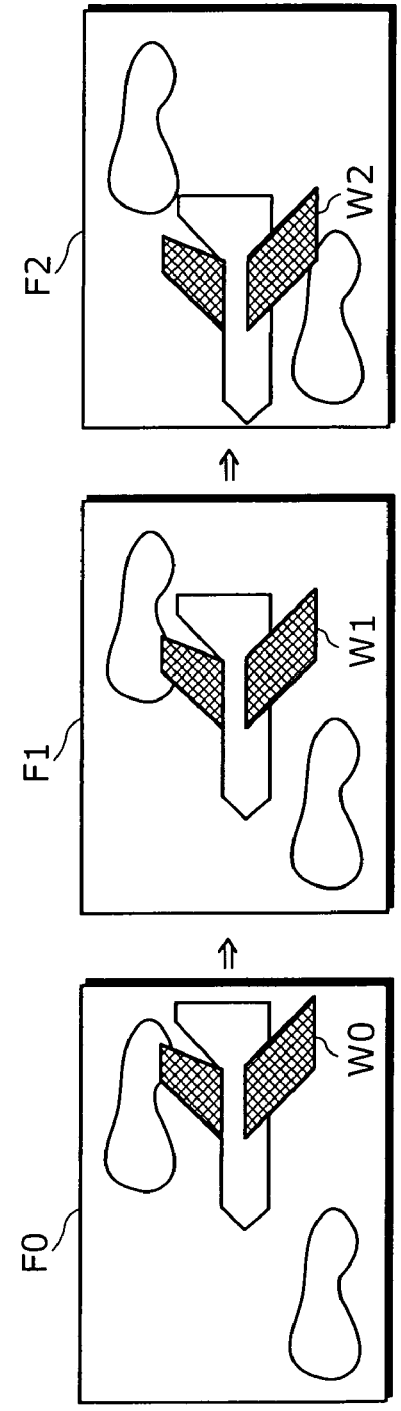
FIG. 3B is a diagram showing the pictures processed by a moving picture processing method according to the first embodiment.

FIG. 3B is a diagram showing the pictures processed by the moving picture processing method according to the present embodiment.

In the moving picture processing method of the present embodiment, noise is generated for the superimposition area W0 in the picture F0, for example, and the generated noise is superimposed on the superimposition area W0. Then, the noise of the superimposition area W0 in the picture F0 is shifted according to the movement of the wing of the airplane in the pictures F0 and F1, and then, gain adjustment is performed. After the gain adjustment, the noise is superimposed on the superimposition area W1 in the picture F1. In the same way, the noise of the superimposition area W1 in the picture F1 is shifted according to the movement of the wing of the airplane in the pictures F1 and F2, and then, gain adjustment is performed. After the gain adjustment, the noise is superimposed on the superimposition area W2 in the picture F2. As a result, the noise shifts together with the wing of the airplane so that the viewer viewing these pictures F0, F1 and F2 as a moving picture perceives the noise superimposed on the superimposition area in each picture as a meticulous pattern of the wing, not as a flicker noise. Consequently, it is possible to increasingly give the impression to the viewer that the pictures are of high quality, and thus to improve the subjective image quality of the pictures.

Note that, in the embodiment, the noise determination unit 103 determines a superimposition area to superimpose noise and its noise level based on the high-frequency components of the input image signal VIN, however, the noise determination unit 103 may determine them based on other characteristics of the input image signal VIN. For example, the noise determination unit 103 may determine a superimposition area to superimpose noise and its noise level based on a variance of the pixel values in an area of the picture indicated by the input image signal VIN. More specifically, in the case where the variance of that area is large, the noise determination determines that area as a superimposition area, and in the case where the variance of that area is small, the noise determination unit 103 does not determine that area as a superimposition area. Thus, it is possible to prevent the noise from being superimposed on an area without variance and to further improve the quality of fine pictures.

Moreover, the noise determination unit 103 may determine a superimposition area to superimpose noise and its noise level using chrominance information. For example, the noise determination unit 103 holds a table in which chrominance and a noise level are associated, and determines a noise level according to the color of the area in a picture indicated by the input image signal VIN. Specifically, in the case where the area has a green color as a main color, the noise determination unit 103 determines the noise level to be high. In the case where the area has a blue color as a main color, the noise determination unit 103 determines the noise level to be low or does not determine that area as a superimposition area.

Also, a superimposition area and its noise level may be determined using edge information. For example, in the case where a picture area indicates an edge artificially represented as in computer graphics or a clear boundary of objects, the noise determination unit 103 does not determine that area as a superimposition area.

Furthermore, in the embodiment, the noise determination unit 103 determines a superimposition area to superimpose noise and its noise level only from the input image signal VIN; however, the motion information MV may also be used for the determination of the superimposition area and the noise level. With the use of the motion information MV, it is possible to control the noise level both in an area where an object moves quickly and in an area where an object moves slowly. For instance, the noise determination unit 103 determines the noise level to be high for the area in which an object moves quickly, and determines the noise level to be low for the area in which an object moves slowly or does not determine that area as a superimposition area.

In the embodiment, the initial noise generation unit 105 generates one type of noise signal N and outputs the generated noise signal N; however, the type of the noise signal N (type of noise) may be different depending on the characteristics of the area in a picture indicated by the input image signal VIN. For example, the initial noise generation unit 105 may examine the direction of the image in the area. In the case where the area has many vertical direction components, the initial noise generation unit 105 generates a noise signal N which has vertical direction components. In the case where the area has many horizontal direction components, the initial noise generation unit 105 generates a noise signal N which has horizontal direction components. In the case where the image has no directions, the initial noise generation unit 105 generates a noise signal N which has randomness. Thus, it is possible to superimpose noise more suitable for an image.

The noise determination unit 103 may determine a present superimposition area to superimpose noise and noise level using the superimposition area and noise level of the noise that is determined in the past. In this case, by determining the noise level to be presently determined based on the noise level of the past, it is possible to further increase temporal sequence of noise and improve the quality of the image on which noise has been superimposed. In addition, it is possible to achieve higher picture quality through the motion compensation performed also on the noise level of the past.

The noise determination unit 103 may use the above-mentioned methods in combination instead of using them independently. Thus, the noise determination unit 103 can make various decisions, and thus can further improve picture quality.

(Variation)

The following describes a variation of the embodiment.

The moving picture processing apparatus according to the variation detects a scene change and newly generates noise without motion compensation being performed on noise, for the first picture after the scene change has occurred. Thus, the picture quality can be improved even when the detail of the moving picture is changed due to TV broadcast.

Figure 4:
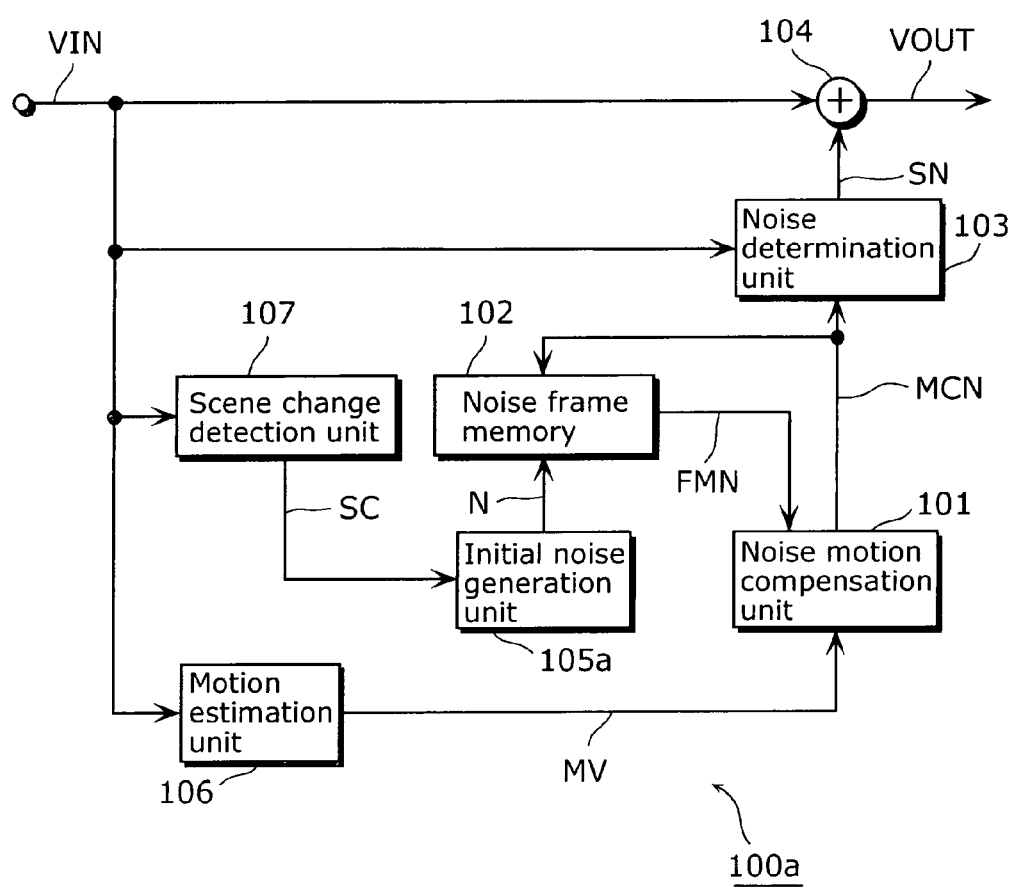
FIG. 4 is a block diagram showing the moving picture processing apparatus according to a variation of the first embodiment.

FIG. 4 is a block diagram showing the moving picture processing apparatus 100*a* according to the variation.

The moving picture processing apparatus 100*a* includes the noise motion compensation unit 101, the noise frame memory 102, the noise determination unit 103, the adder 104, an initial noise generation unit 105*a*, the motion estimation unit 106 and a scene change detection unit 107.

The scene change detection unit 107 obtains an input image signal VIN, and judges whether or not the detail of the moving picture changes, that is, whether or not there is a scene change, based on the input image signal VIN. In the case of judging that there is a scene change, the scene change detection unit 107 outputs a scene change signal SC to the initial noise generation unit 105*a*.

Having obtained the scene change signal SC from the scene change detection unit 107, the initial noise generation unit 105*a* generates a noise signal N to be superimposed on the input image signal VIN and outputs the noise signal N to the noise frame memory 102. The initial noise generation unit 105*a* also specifies a superimposition area as the noise determination unit 103, and generates a noise signal N according to the characteristics of an image in the superimposition area. For example, in the case where a superimposition area presents an artificial object such as a wing of an airplane, a noise signal N indicating structured noise is generated, while in the case where a superimposition area presents a natural object such as a wood, a noise signal N indicating random noise is generated. Note that instead of specifying a superimposition area, the initial noise generation unit 105*a* may be informed of the characteristics of an image in the superimposition area determined by the noise determination unit 103, and generate a noise signal N according to the characteristics.

In the case of obtaining the noise signal N outputted as a stored noise signal FMN from the initial noise generation unit 105*a* via the noise frame memory 102, the noise motion compensation unit 101, as described in the above embodiment, does not perform motion compensation on the stored noise signal FMN and outputs the stored noise signal FMN as a motion-compensated noise signal MCN. Note that the noise motion compensation unit 101 may stop the execution of motion compensation when directly instructed by the initial noise generation unit 105*a*. For example, the initial noise generation unit 105*a* outputs the noise signal N as well as a notification signal indicating that the noise signal N has been outputted, to the noise motion compensation unit 101. Upon obtaining the notification signal, the noise motion compensation unit 101 then outputs the noise signal N as the motion-compensated noise signal MCN, without performing motion compensation on the noise signal N acquired via the noise frame memory 102.

Figure 5:
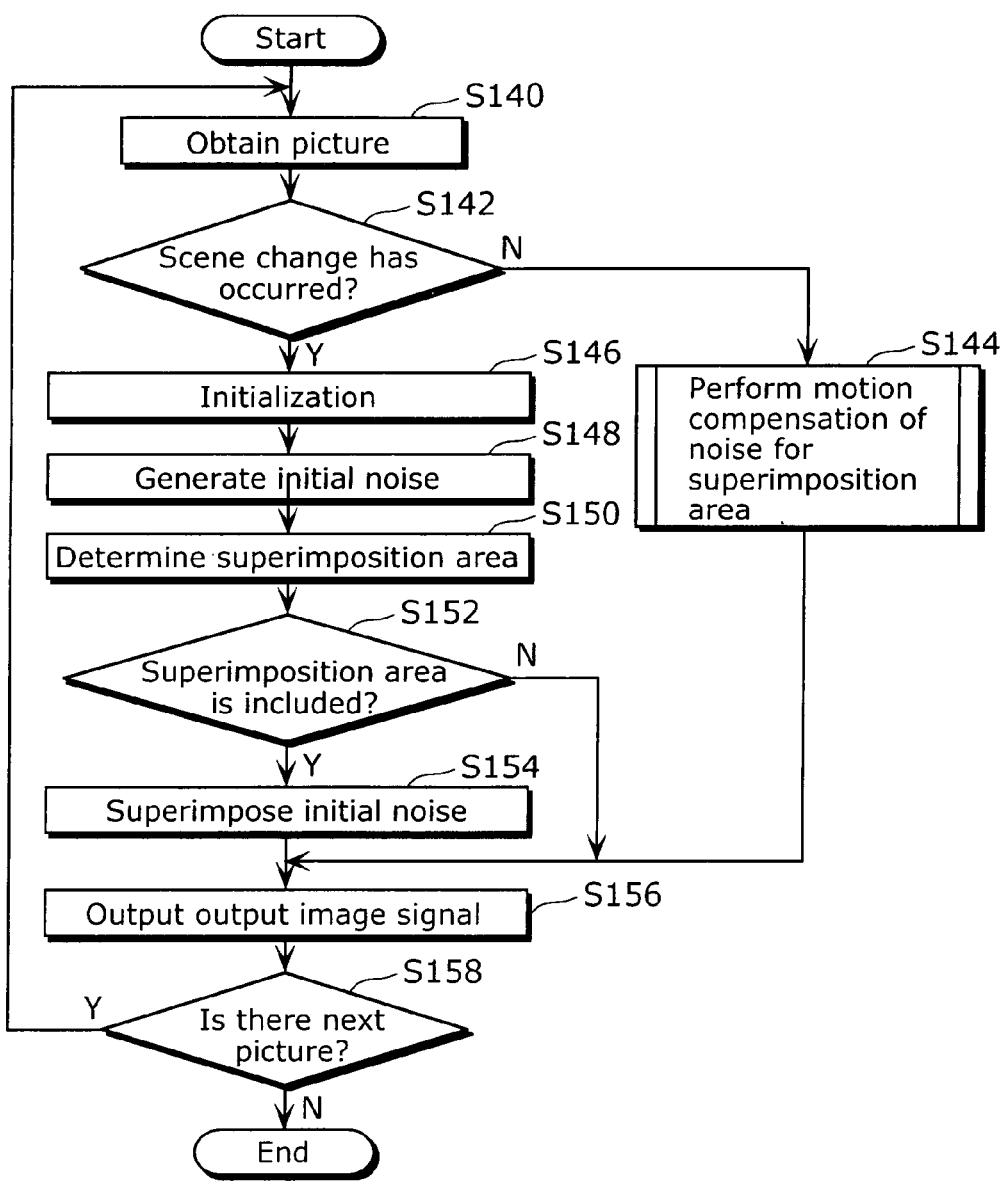
FIG. 5 is a flowchart showing the operation of the moving picture processing apparatus according to the variation of the first embodiment.

FIG. 5 is a flow chart showing the operation of the moving picture processing apparatus 100*a* according to the variation.

First, after obtaining a picture indicated by the input image signal VIN (Step S140), the scene change detection unit 107 compares the obtained picture with an immediately-previous (past) picture, for instance, and judges whether or not a scene change has occurred (Step S142). For example, the scene change detection unit 107 calculates, for the same positions in the two pictures, a difference between the pixel values at those positions. In the case where a sum of absolute differences in the whole picture is less than or equal to a predetermined value, the scene change detection unit 107 judges that a scene change has occurred. In the case where the obtained picture is a head picture indicated by the input picture image VIN, the scene change detection unit 107 judges that no scene change has occurred.

In the case where the scene change detection unit 107 judges that no scene change has occurred (N in Step S142), the motion estimation unit 106, the noise motion compensation unit 101 and the noise determination unit 103 perform the same processing as in Steps S108 to S120 shown in FIG. 2 (Step S144). In other words, the moving picture processing apparatus 100*a* judges whether or not the picture obtained in Step S140 includes a superimposition area. In the case where the picture includes a superimposition area, the moving picture processing apparatus 100*a* performs noise motion compensation on that superimposition area, and superimposes the motion-compensated noise on the superimposition area in the picture. In the case where the picture does not include a superimposition area, the moving picture processing apparatus 100*a* omits the processing such as noise motion compensation of the picture.

In the case where the scene change detection unit 107 judges that a scene change has occurred (Y in Step S142), the scene change detection unit 107 causes the initial noise generation unit 105 to initialize noise by outputting the scene change signal SC to the initial noise generation unit 105*a* (Step S146). Here, the motion information MV estimated by the motion estimation unit 106 is also initialized. Therefore, the noise superimposed on the picture before a scene change occurs is not used for the pictures after the scene change.

After the initialization in Step S146, the initial noise generation unit 105*a* newly generates a noise signal N and outputs the generated noise signal N (Step S148). Then, the noise determination unit 103 determines a superimposition area to superimpose noise in the picture obtained in Step S140 and its noise level (Step S150).

The noise determination unit 103 then judges whether or not the picture includes a superimposition area based on the determination result in Step S150 (Step S152). In the case of judging that the picture includes a superimposition area (Y in Step S152), the noise determination unit 103 obtains, from the noise frame memory 102 via the noise motion compensation unit 101, the noise signal N which is generated by the initial noise generation unit 105*a* and stored as a stored noise signal FMN in the noise frame memory 102. The noise determination unit 103 then adjusts the gain of the noise signal N so that the noise level of the noise signal N becomes equal to the noise level determined in Step S150, and outputs the noise signal N for which the gain has been adjusted, as a superimposition noise signal SN. As a result, the adder 104 superimposes the superimposition noise signal SN onto the superimposition area in the picture determined by the noise determination unit 103 (Step S154).

When the superimposition noise signal SN is superimposed on the superimposition area in Step S154 or S144, the adder 104 outputs the input image signal VIN on which the superimposition noise signal SN has been superimposed, as an output image signal VOUT. When it is judged that picture does not include a superimposition area and the superimposition noise signal SN has not been superimposed, in Step S152 or S144, the adder 104 outputs the input image signal VIN as an output image signal VOUT (Step S156).

Then, the scene change detection unit 107 judges whether or not there is a picture which is to be processed next and is indicated by the input image signal VIN (Step S158). In the case of judging that there is such a picture (Y in Step S158), the scene change detection unit 107 repeats the processing from Step S140. In the case of judging that there is no such picture (N in Step S158), the scene change detection unit 107 terminates the processing of the moving picture.

Figure 6A:
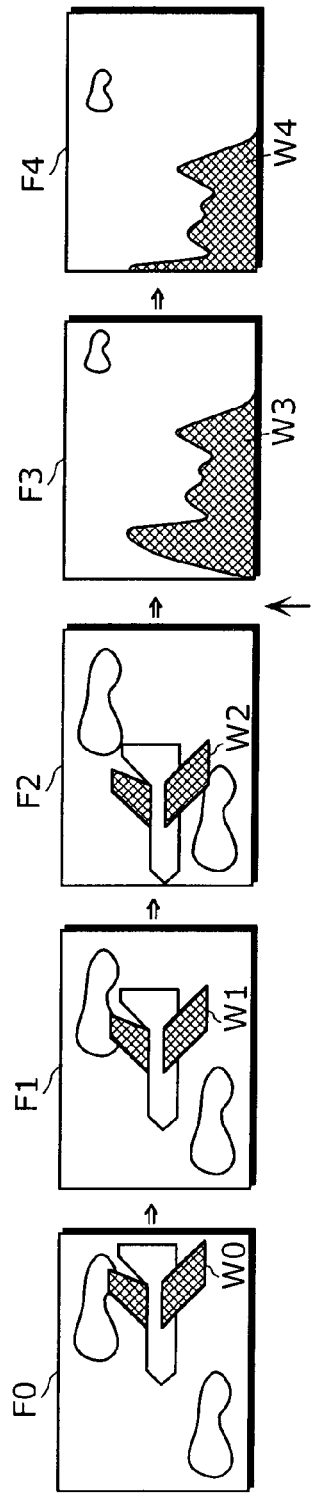
FIG. 6A is a diagram showing the pictures displayed in the case where processing in accordance with scene change is not performed.

FIG. 6A is a diagram showing the pictures displayed in the case where processing in accordance with scene change is not performed.

In the case where processing in accordance with scene change is not performed, noises having the same characteristics are superimposed onto the superimposition areas W0 to W4 in the pictures F0 to F4 although the scene change has occurred between the picture F2 and the picture F3.

In other words, in the case where the picture F0 is a head picture indicated by the input image signal VIN, the superimposition area W0 in the picture F0 represents an artificial object such as a wing of the airplane so that structured noise is superimposed on the superimposition area W0. Then, the noise in the superimposition area W0 of the picture F0 is motion compensated, shifted in accordance with the movement of the wing, and superimposed on the superimposition areas W1 and W2 of the pictures F1 and F2. Therefore, the noises having the same direction are superimposed onto the superimposition areas W1 to W2 in the pictures F0 to F2. Even when a scene change has occurred between the pictures F2 and F3, if the motion compensation as described above has been performed, the structured noise should be superimposed onto the superimposition areas W3 and W4 in the pictures F3 and F4. That means that the noise having the same direction as the direction of the artificial object is superimposed although the superimposition areas W3 and W4 in the pictures F3 and F4 represent a mountain which is a natural object, which may possibly give a sense of discomfort to the viewers.

Figure 6B:
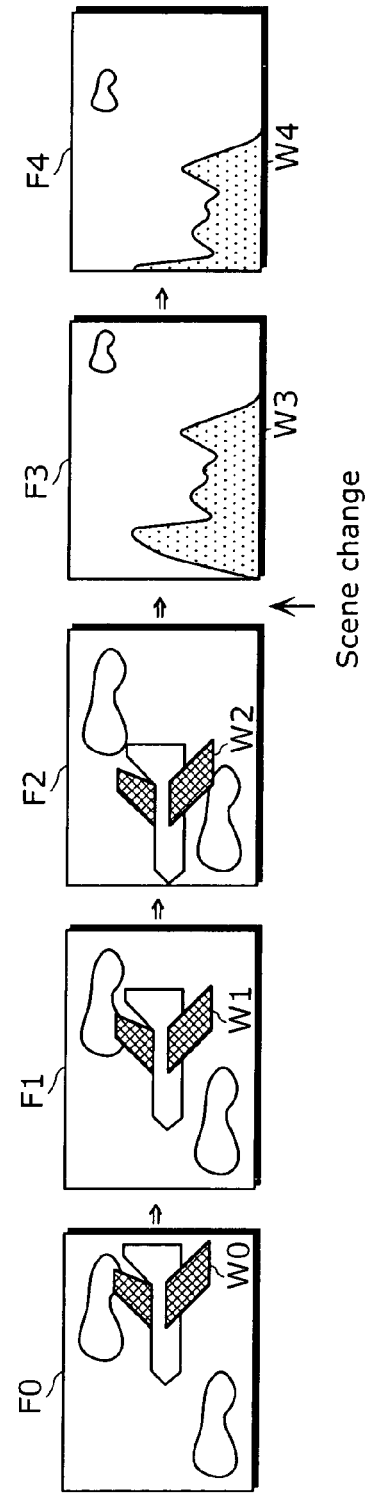
FIG. 6B is a diagram showing the pictures processed by the moving picture processing method according to the variation of the first embodiment.

FIG. 6B is a diagram showing the pictures processed by the moving picture processing method according to the variation.

In the moving picture processing method according to the variation, in the case where a scene change has occurred between the picture F2 and the picture F3, the noise having the direction in which noise has been superimposed before the picture F2 is not used for the superimposition area W3 in the picture F3, and instead, noise in accordance with the image in the superimposition area W3 is newly generated and then superimposed. As a result, suitable random noise can be superimposed on a natural object such as a mountain. Therefore, even when a scene change has occurred, it is possible to increase the feeling that the pictures are of high quality, without giving a sense of discomfort to the viewers.

In this way, with the moving picture processing apparatus 100*a* according to the variation, it is possible to change a noise to be superimposed, according to a scene change occurred in an inputted moving picture, and thus to reduce the sense of discomfort caused by the scene change.

Note that, according to the variation, the scene change detection unit 107 detects a scene change based on a sum of absolute differences between the pixel values co-located in two pictures of different times; however, a scene change may be detected using other methods. For example, the scene change detection unit 107 detects a scene change based on a sum of absolute differences between a picture on which motion compensation is performed using the motion information MV and a picture in which a scene change is to be detected. In such a case, false detection can be prevented compared with the case of detecting a scene change based on a sum of absolute differences in the same position. In other words, it is possible to prevent false detection of falsely detecting that a scene change has occurred based on the movement of an image even though no scene change has occurred, or falsely detecting that no scene change has occurred even though a scene change has actually occurred.

A calculated value should not be limited to a sum of absolute differences, and a different indicator which allows perception of difference between images can be used instead, e.g., a sum of squares of difference in pixel values.

The scene change detection unit 107 detects a scene change based on a sum of absolute differences in the whole picture; however, a scene change may be detected per picture area based on a sum of absolute differences between the areas. Namely, the motion-compensated noise is superimposed on each area in each picture area, or the noise generated by the initial noise generation unit 105*a* is superimposed on each area. For example, in the case where a background does not change and only an object changes in a moving picture, the noise generated by the initial noise generation unit 105*a* is superimposed only on an area which represents the object, and the motion-compensated noise is superimposed on the other areas.

Second Embodiment

The moving picture processing apparatus according to the second embodiment of the present invention decodes a coded picture signal BS indicating coded pictures, and superimposes noise onto the decoded pictures through the same processing as described in the first embodiment.

Figure 7:
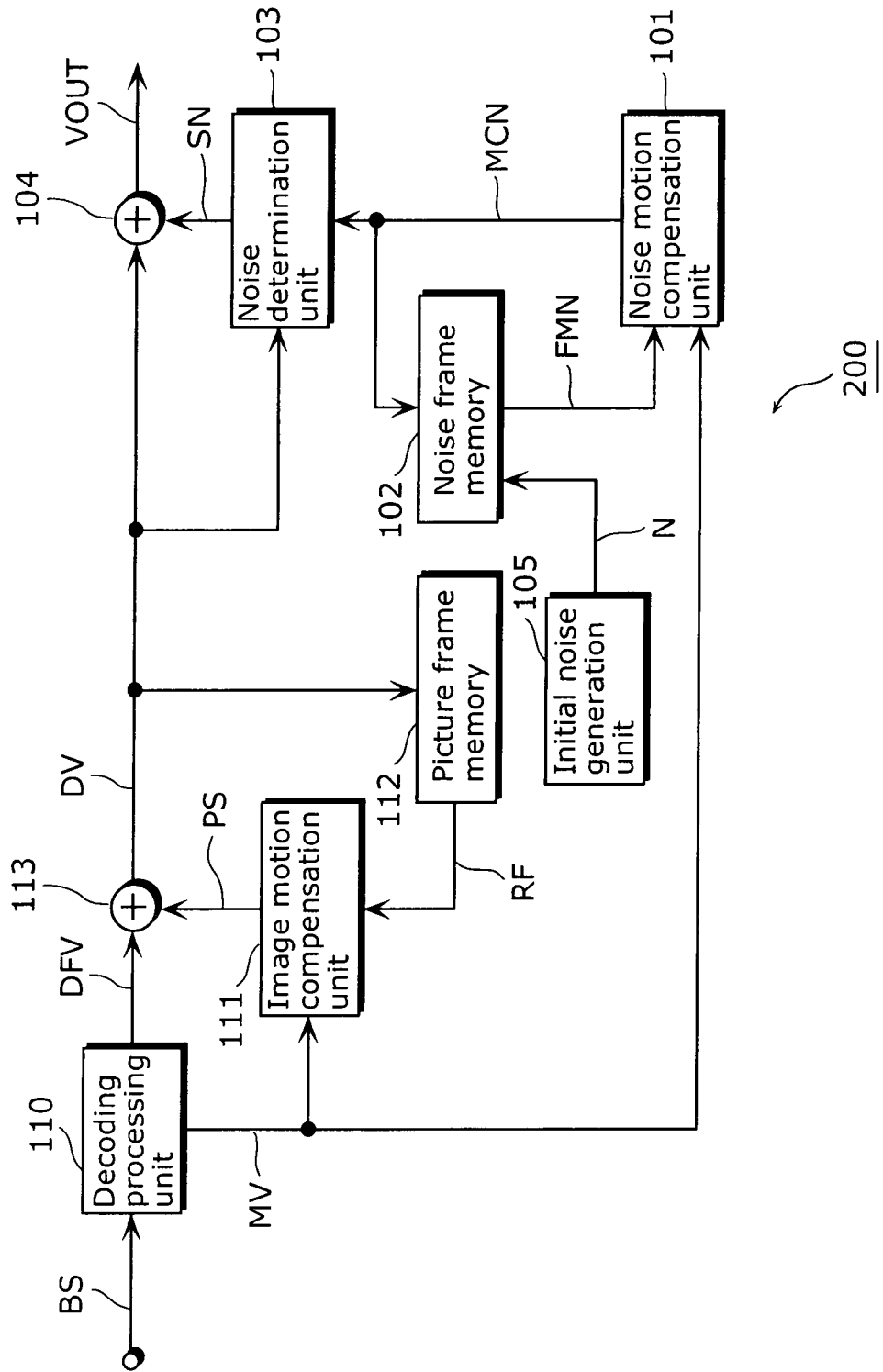
FIG. 7 is a block diagram showing the moving picture processing apparatus according to a second embodiment of the present invention.

FIG. 7 is a block diagram showing the moving picture processing apparatus according to the embodiment.

A moving picture processing apparatus 200 of the embodiment includes a decoding processing unit 110, an image motion compensation unit 111, a picture frame memory 112, an adder 113, the adder 104, the noise determination unit 103, the noise frame memory 102, the initial noise generation unit 105 and the noise motion compensation unit 101. That is to say that the moving picture processing apparatus 200 includes the components of the moving picture apparatus 100 of the first embodiment, except for the motion estimation unit 106, and further includes the decoding processing unit 110, the image motion compensation unit 111 and the picture frame memory 112 and the adder 113.

The decoding processing unit 110 performs decoding processing such as variable length decoding, inverse quantization and inverse orthogonal transform on a coded picture signal BS, and outputs motion information MV which indicates a motion vector, and a difference image signal DFV. The coded picture signal BS is a signal generated by the coding method using motion information as in Moving Picture Expert Group (MPEG), for instance.

The picture frame memory 112 stores, as a reference picture RF, a picture indicated by a decoded image signal DV outputted from the adder 113.

The image motion compensation unit 111 performs motion compensation on an image using the motion information MV outputted from the decoding processing unit 110, and a reference picture RF stored in the picture frame memory 112, for each area (a block, a macroblock, and etc) included in a current picture to be decoded. In other words, the image motion compensation unit 111 extracts an area in the reference picture RF indicated by the motion information MV, and outputs the extracted area to the adder 113 as a predictive image signal PS of the current area to be decoded.

The adder 113 adds, for each current area to be decoded, the predictive image signal PS to the difference image signal DFV outputted from the decoding processing unit 110, and outputs the resulting signal as a decoded image signal DV.

The noise determination unit 103 and the adder 104 according to the embodiment handle the decoded image signal DV outputted from the adder 113, as the input image signal VIN of the first embodiment, and perform the same processing as described in the first embodiment.

The noise motion compensation unit 101 according to the embodiment performs the same processing as described in the first embodiment, using the motion information MV outputted from the decoding processing unit 110.

Figure 8:
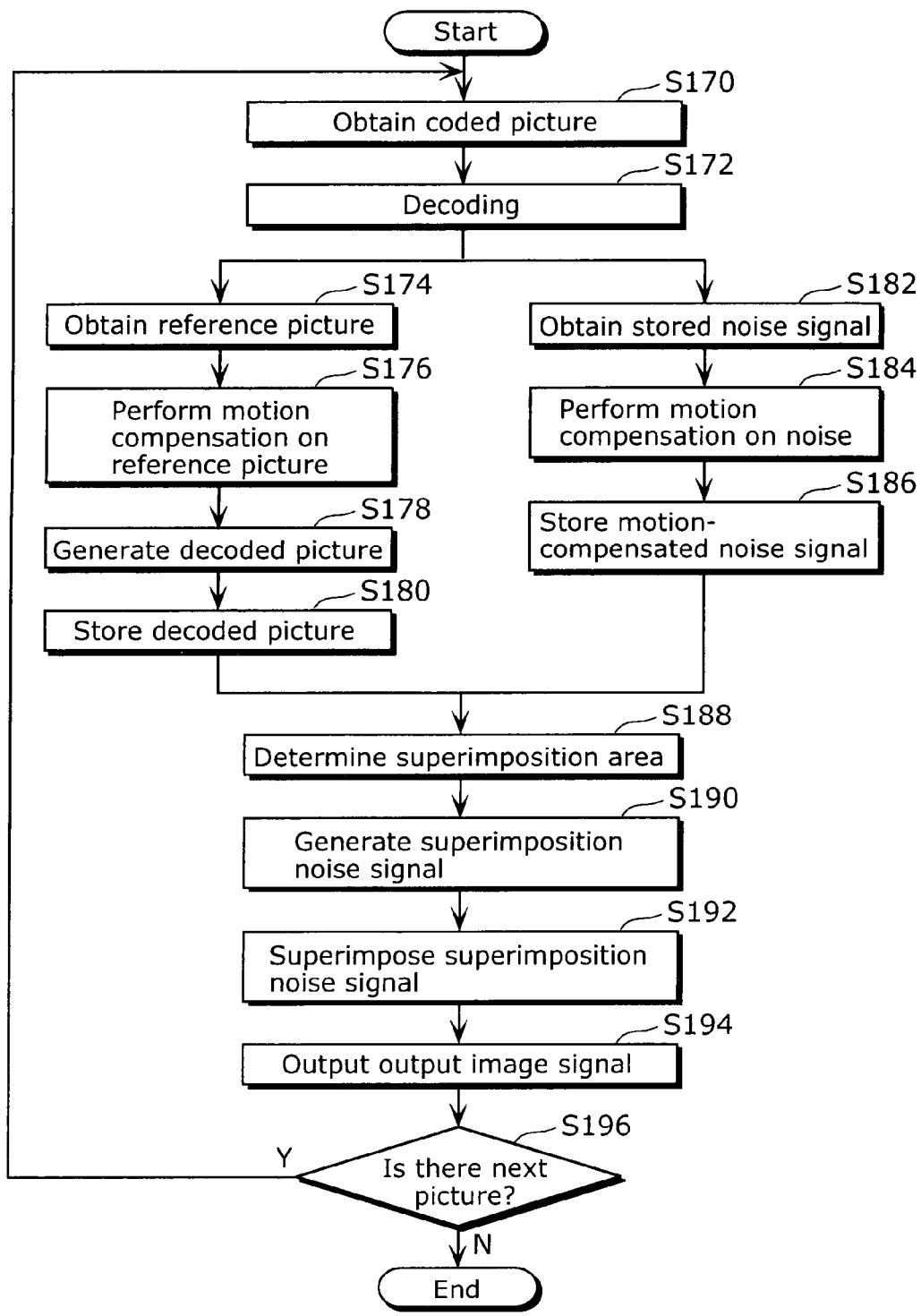
FIG. 8 is a flowchart showing the operation of the moving picture processing apparatus according to the second embodiment.

FIG. 8 is a flowchart showing the operation of the moving picture processing apparatus 200 according to the embodiment.

After having obtained a coded picture included in the coded picture signal BS (Step S170), the decoding processing unit 110 of the moving picture processing apparatus 200 decodes the coded picture and outputs the difference image signal DFV and the motion information MV (Step S172).

Next, the image motion compensation unit 111 obtains a reference picture RF from the picture frame memory 112 (Step S174), and performs motion compensation on the reference picture RF using the motion information MV outputted in Step S172 (Step S176). Then, the adder 113 generates a decoded picture by adding the predictive image signal PS generated through the motion compensation in Step S176 to the difference image signal DFV outputted through the decoding processing in Step S172, and outputs the decoded picture as the decoded image signal DV (Step S178). Moreover, the adder 113 stores, as a reference picture RF, the decoded picture indicated by the decoded image signal DV into the picture frame memory 112 (Step S180).

The noise motion compensation unit 101 obtains a stored noise signal FMN from the noise frame memory 102 (Step S182), and performs motion compensation on the noise indicated by the stored noise signal FMN, using the motion information MV outputted in Step S172 (Step S184). In addition, the noise motion compensation unit 101 stores, as the stored noise signal FMN, a motion-compensated noise signal MCN generated through the motion compensation in Step S184 into the noise frame memory 102 (Step S186).

The processing carried out in Steps S174 to S180 and the processing carried out in Steps S182 to S186 are performed in parallel. In the case where the coded picture obtained in Step S170 is a head picture included in the coded picture signal BS, the process of generating a noise signal N, instead of the processing in Steps S182 and S184, is performed by the initial noise generation unit 105. Then, the noise signal N is stored as a motion-compensated noise signal MCN into the noise frame memory 102.

Next, the noise determination unit 103 determines a superimposition area to superimpose noise, in a decoded picture indicated by the decoded image signal DV (Step S188). The noise determination unit 103 further generates a superimposition noise signal SN by performing gain adjustment for the motion-compensated noise signal MCN generated through the motion compensation in Step S184, and outputs the superimposition noise signal SN (Step S190).

Then, the adder 104 superimposes the superimposition noise signal SN generated in Step S190 onto the superimposition area (Step S192), and outputs an output image signal VOUT (Step S194). Note that in the case where the superimposition area determined in Step S190 is not included in the picture, Step S192 is not performed, and the decoded picture generated in Step S178 is outputted as an output image signal VOUT.

Then, the decoding processing unit 110 judges whether or not there is a coded picture to be processed next in the coded picture signal BS (Step S196). In the case of judging that there is such coded picture (Y in Step S196), the decoding processing unit 110 repeats the processing from Step S170, while in the case of judging that there is no such coded picture (N in Step S196), the decoding processing unit 110 terminates the processing of the moving picture.

Note that, in the embodiment, the moving picture processing apparatus 200 includes the image motion compensation unit 111 and the noise frame memory 102; however, instead of these units, a single motion compensation unit having the functions equipped in the both units may be included in the moving picture processing apparatus 200. Likewise, the moving picture processing apparatus 200 includes the image frame memory 112 and the noise frame memory 102; however, instead of these units, the moving picture processing apparatus 200 may include a single frame memory having the functions of the both units.

Figure 9A:
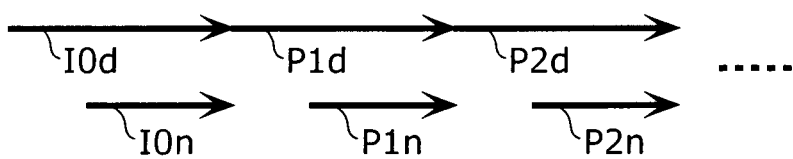
FIG. 9A is a diagram showing a timing to perform decoding processing and noise processing by the moving picture processing apparatus according to the second embodiment.

FIG. 9A is a diagram showing a timing to perform decoding processing and noise processing performed by the moving picture processing apparatus 200 according to the embodiment.

For example, in the case where a coded picture signal BS is composed of intra-coded pictures (I pictures) and forward predictive coded pictures (P pictures), the moving picture processing apparatus 200 performs decoding processing I0$d$ and noise processing I0$n$ at the same time on an I picture I0. Note that the decoding processing on a picture is equivalent to the processing in Steps S170 to S180 shown in FIG. 8, whereas the noise processing on a picture is equivalent to the processing in Steps S182 to S186 shown in FIG. 8.

With regard to P pictures P1 and P2 which follow the I picture I0, the moving picture processing apparatus 200 also performs, as described above, decoding processing P1$d$ and noise processing P1$n$ at the same time on the P picture P1, and performs decoding processing P2$d$ and noise processing P2$n$ at the same time on the P picture P2.

Figure 9B:
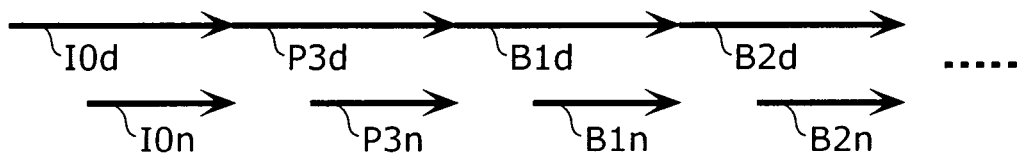
FIG. 9B is a diagram showing another timing to perform decoding processing and noise processing by the moving picture processing apparatus according to the second embodiment.

FIG. 9B is a diagram showing another timing to perform decoding processing and noise processing performed by the moving picture processing apparatus 200 according to the embodiment.

For example, in the case where a coded picture signal BS is composed of intra-coded pictures (I pictures) and forward predictive coded pictures (P pictures) and bi-directional predictive coded pictures (B pictures), the moving picture processing apparatus 200 performs, as described above, decoding processing B1$d$ and noise processing B1$n$ at the same time on a B picture B1, and performs decoding processing B2d and noise processing B2n at the same time on a B picture B2.

Thus, with the moving picture processing apparatus 200 of the embodiment, by simultaneously executing decoding processing and noise processing, it is possible to shorten the entire time for processing the moving picture. Furthermore, the moving picture processing apparatus 200 uses the motion information MV outputted from the decoding processing unit 110 for performing motion compensation on noise, and thus does not estimate a motion of a moving picture indicated by the decoded image signal DV. Therefore, the motion estimation process is omitted, which allows the processing load to be reduced.

Note that, in the embodiment, as in the variation of the first embodiment, the scene change detection unit 107 may be included in the moving picture processing apparatus 200 so that the noise signal N from the initial noise generation unit 105 is superimposed on the decoded image signal DV each time a scene change is detected in the decoded image signal DV.

The picture frame memory 112 and the noise frame memory 102 may manage a picture indicated by a decoded image signal DV and noise indicated by a stored noise signal FMN respectively either on a picture basis, on a macroblock basis or on a block basis.

The noise signal N may indicate only luminance of each pixel. This prevents color drift from being caused in the case where noise has been added, and thus can reduce the size of a circuit.

For example, in the case where a predetermined area is intra-coded and the noise motion compensation unit 101 could not obtain the motion information MV in that area from the decoding processing unit 110, the noise motion compensation unit 101 may output the noise signal N outputted from the initial noise generation unit 105, as a motion-compensated noise signal MCN, without performing motion compensation.

Third Embodiment

When a coded picture signal is generated by coding a moving picture with the picture coding apparatus according to the third embodiment, the coded picture signal includes a noise flag indicating whether or not to superimpose noise on a decoded moving picture, and a motion compensation flag indicating whether or not to generate noise through motion compensation.

Figure 10:
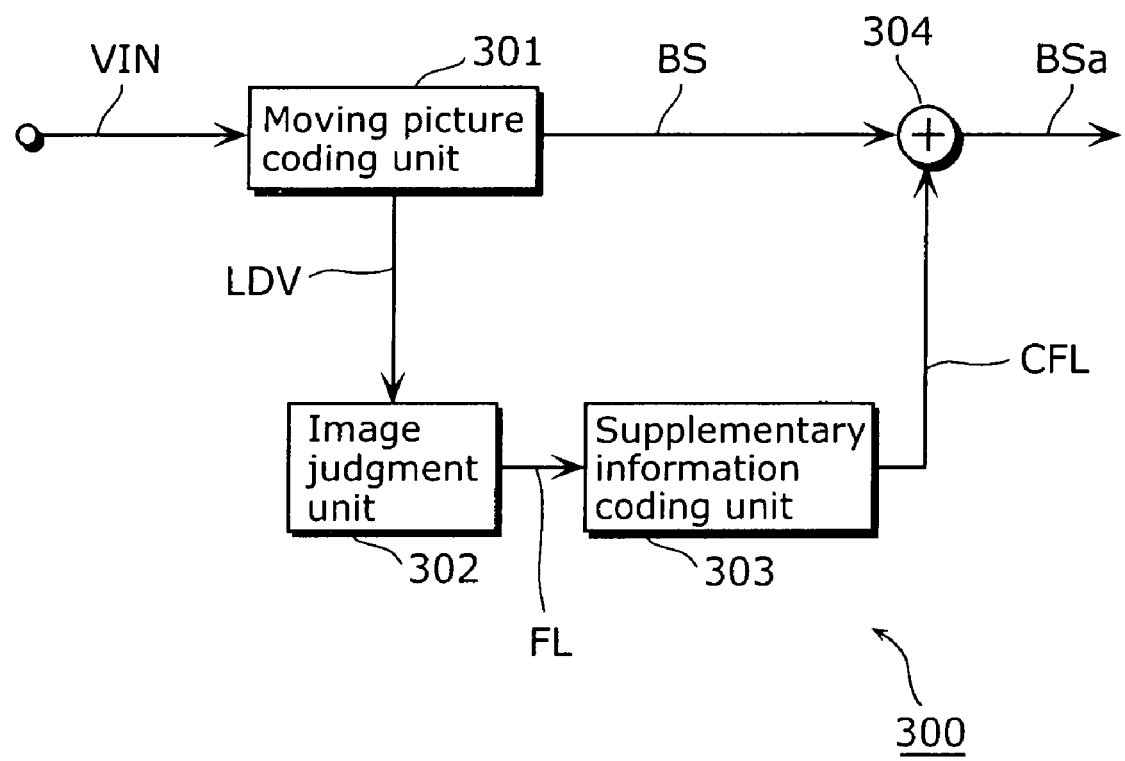
FIG. 10 is a block diagram showing a picture coding apparatus according to a third embodiment of the present invention.

FIG. 10 is a block diagram showing a picture coding apparatus 300 according to the embodiment.

The picture coding apparatus 300 includes a moving picture coding unit 301, an image judgment unit 302, a supplementary information coding unit 303 and an adder 304.

The moving picture coding unit 301 generates a coded picture signal BS by performing compressive coding on each picture indicated by an input image signal VIN, and outputs the coded image signal BS. In addition, the moving picture coding unit 301 decodes each of the coded pictures and outputs a decoded image signal LDV indicating the decoded pictures. The compressive coding here is a process to reduce the data amount of the input image signal VIN. For example, according to the MPEG, compressive coding is to perform frequency transform, quantization and variable length coding on a difference image which indicates a difference between a predictive image and an original image, using an inter-picture predictive coding method and an intra-picture predictive coding method. In this case, the decoded image signal LDV is a signal generated for performing inter-picture prediction.

However, the MPEG is merely one example and the compressive coding method shall not be limited to this. A decoded image signal LDV may be generated not only in the case of inter-picture predictive coding, but also in the case of intra-picture predictive coding.

The image judgment unit 302 generates, for each area in a decoded picture, which is indicated by the decoded image signal LDV, according to the characteristics of the area, a noise flag indicating whether or not to superimpose noise and a motion compensation flag indicating whether or not to generate noise through motion compensation. The image judgment unit 302 then outputs the noise flag and motion compensation flag as a flag signal FL. Note that the image judgment unit 302 may further output an adjustment signal indicating how to adjust noise according to the characteristics of a picture which are indicated by a decoded image signal LDV.

The supplementary information coding unit 303 obtains the flag signal FL from the image judgment unit 302, performs coding such as variable length coding on the flag signal FL, and outputs the result of the coding process as a coded flag signal CFL.

The adder 304 combines, for each area as described above, the coded image signal BS outputted from the moving picture coding unit 301 and the coded flag signal CFL outputted from the supplementary information coding unit 303, and outputs the signal thus combined as the coded signal BSa.

Note that in the case where the image judgment unit 302 outputs also the adjustment signal as described above, the adjustment signal is variable length coded as is the case of the flag signal FL, and is included in the coded signal BSa as a coded adjustment signal.

Figure 11:
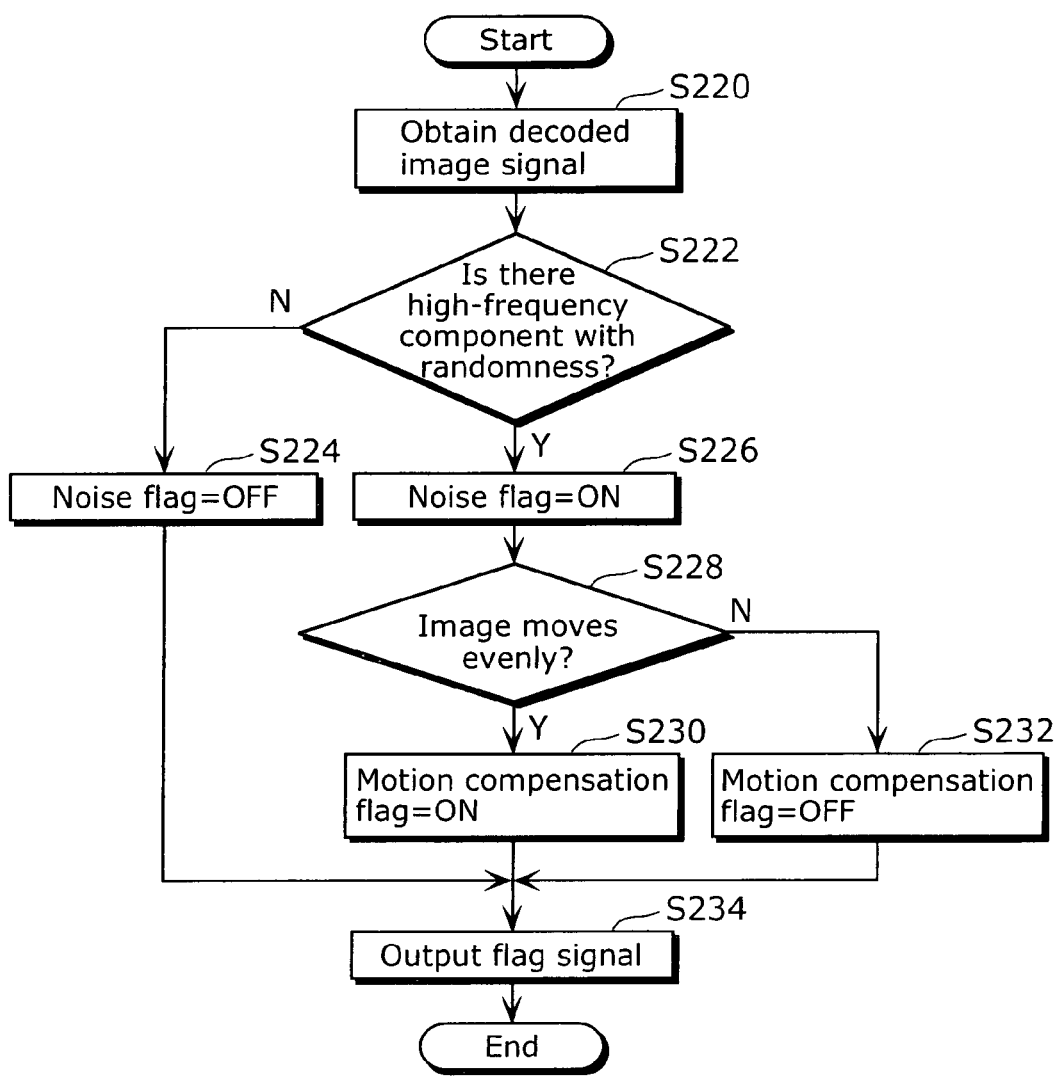
FIG. 11 is a flowchart showing the operation of an image judgment unit according to the third embodiment.

FIG. 11 is a flowchart showing the operation of the image judgment unit 302 in the embodiment.

First, the image judgment unit 302 obtains a decoded image signal LDV (Step S220), and judges, for each area in a picture, which is indicated by the decoded image signal LDV, whether or not a high frequency component having randomness is included in the area (Step S222). In the case of judging that such high frequency component is not included (N in Step S222), the image judgment unit 302 then sets the noise flag of that area to be OFF (Step S224). On the contrary, in the case of judging that such high frequency component is included (Y in Step S222), the image judgment unit 302 sets the noise flag of that area to be ON (Step S226).

Moreover, the image judgment unit 302 judges whether or not an image moves evenly in all the areas judged to include high frequency component having randomness (Step S228). For example, the image judgment unit 302 calculates a variance of the motion information for these areas by referring to a picture (temporally) previous to the picture having such areas, and in the case where the variance is smaller than a predetermined value, judges that an image in all such areas moves evenly. In the case where the variance is greater than the predetermined value, the image judgment unit 302 judges that the image in all of such areas does not move evenly.

In the case of judging that the image moves evenly (Y in Step S228), the image judgment unit 302 sets a motion compensation flag of each area to be ON (Step S230). In the case of judging that the image does not move evenly (N in Step S228), the image judgment unit 302 sets a motion compensation flag of each area to be OFF (Step S232).

The image judgment unit 302 then generates a flag signal FL indicating the noise flag and the motion compensation flag set in Steps S224, S226, S230 and S232, and outputs the flag signal FL (Step S234). For example, the flag signal FL includes only the noise flag which is set to be OFF, or the noise signal flag which is set to be ON and the motion compensation flag which is set to be ON, or the noise signal flag which is set to be ON and the motion compensation flag which is set to be OFF.

With the picture coding apparatus 300 according to the embodiment, a coded flag signal CFL is added for each area in a coded picture so that it is possible for a picture decoding apparatus, which has obtained a coded signal BSa, to easily judge whether or not to superimpose noise for each area in that picture and whether or not to perform motion compensation on noise when superimposing the noise, after decoding of the coded picture. That is to say that, with the picture decoding apparatus, it is possible to easily superimpose a suitable noise on a suitable area without identifying the characteristics of a decoded picture, and to improve the quality of the decoded picture.

Note that, in the embodiment, the image judgment unit 302 sets a motion compensation flag based on the evenness in the movement; however, a motion compensation flag may be set using a different method. For example, the image judgment unit 302 may examine an amount of the movement of a picture indicated by the decoded image signal LDV, and in the case where the examined amount is greater than or equal to a predetermined value, a motion compensation flag may be set to be OFF. Alternatively, the image judgment unit 302 may set a motion compensation flag based on the combination of the amount of movement and the evenness in movement.

According to the embodiment, the supplementary information coding unit 303 performs variable length coding, but the supplementary information coding unit 303 may perform coding using a different method. For example, in the case of being capable of predicting a flag signal FL based on a coded image signal BS, the supplementary information coding unit 303 can code only a flag signal FL which is unpredictable, which enables reduction in the amount of coding.

(Variation 1)

The following describes a variation 1 of the third embodiment.

While the image judgment unit 302 of the embodiment generates a flag signal FL based on a decoded image signal LDV, an image judgment unit according to the variation generates a flag signal FL based on an input image signal VIN.

Figure 12:
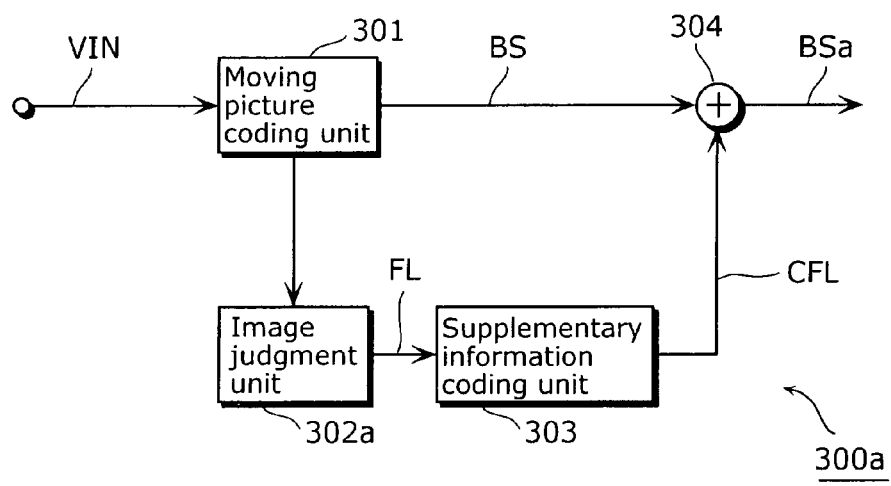
FIG. 12 is a block diagram showing the picture coding apparatus according to a variation 1 of the third embodiment.

FIG. 12 is a block diagram showing a picture coding apparatus according to the variation.

A picture coding apparatus 300a includes an image judgment unit 302a for obtaining an input image signal VIN, instead of the image judgment unit 302 of the picture coding apparatus 300 in the embodiment.

The image judgment unit 302a performs the same processing as that of the image judgment unit 302, using an input image signal VIN instead of a decoded image signal LDV. In other words, the image judgment unit 302a sets, for each area in a picture, which is indicated by the input image signal VIN, a noise flag and a motion compensation flag according to the characteristics of the area, and outputs the noise flag and the motion compensation flag as a flag signal FL.

As a result, according to the variation, the decoded image signal LDV is not outputted. Therefore, it is possible to reduce the size of a circuit, compared with the picture coding apparatus 300 of the embodiment.

(Variation 2)

The following describes a variation 2 of the third embodiment.

The supplementary information coding unit according to the variation performs variable length coding on a flag signal FL using motion information.

Figure 13:
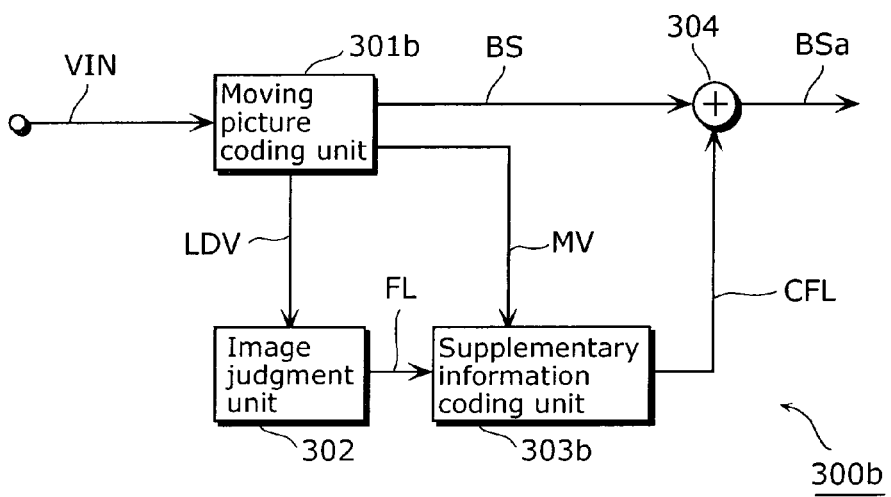
FIG. 13 is a block diagram showing the picture coding apparatus according to a variation 2 of the second embodiment.

FIG. 13 is a block diagram showing the picture coding apparatus of the variation.

The picture coding apparatus 300b of the variation includes a moving picture coding unit 301b which outputs motion information MV indicating the movement of an image indicated by the input image signal VIN, instead of the moving picture coding unit 301 of the picture coding apparatus 300 of the embodiment. The picture coding apparatus 300b also includes a supplementary information coding unit 303b which obtains a flag signal FL and the motion information MV as described above, instead of the supplementary information coding unit 303 of the picture coding apparatus 300.

The moving picture coding unit 301b, equipped with the motion estimation unit 106 of the first embodiment, estimates the motion of an image between the pictures which is indicated by the input image signal VIN, and outputs the motion information MV indicating the movement, as well as performs inter-picture predictive coding using the motion information MV. Note that the motion information MV is coded and stored in a coded image signal BS.

The supplementary information coding unit 303b predicts a flag signal (a noise flag and a motion compensation flag) of each of the areas using the motion information MV outputted from the moving picture coding unit 301b, and performs variable length coding on the flag signal outputted from the image judgment unit 302 based on the result of the prediction.

Figure 14:
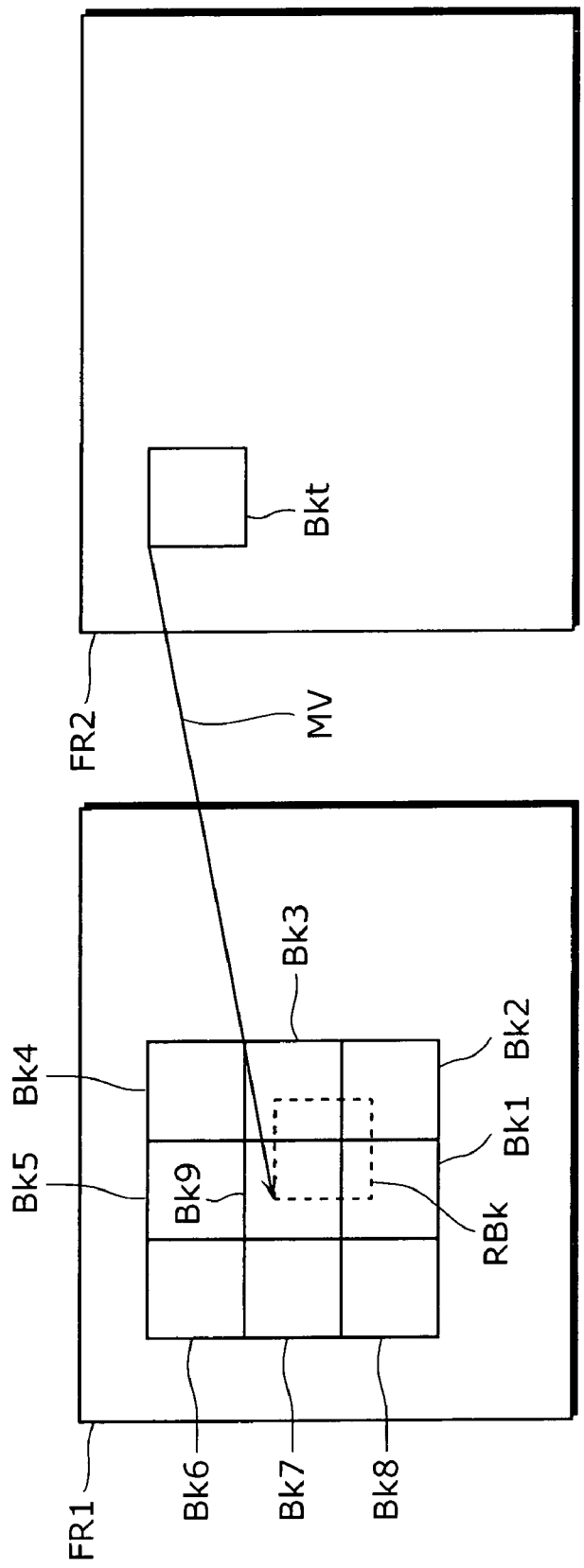
FIG. 14 is a diagram illustrating variable length coding performed by a supplementary information coding unit according to the variation 2 of the third embodiment.

FIG. 14 is a diagram illustrating variable length coding performed by the supplementary information coding unit 303b.

For example, in the case of coding a flag signal for a block Bkt in a picture FR2, the supplementary information coding unit 303b refers to a reference picture FR1 used for generating a predictive picture for coding the picture FR2. The supplementary information coding unit 303b also obtains, from the moving picture coding unit 301b, the motion information MV estimated for the block Bkt in the picture FR2. The motion information MV indicates a block RBk in the reference picture FR1.

The supplementary information coding unit 303b specifies the flag signal which is set for a block Bk9 which is the most similar to a reference block RBk. In other words, the supplementary information coding unit 303b predicts that the flag signal which is set for the block Bkt is as same as the flag signal which is set for the block Bk9. The supplementary information coding unit 303b then performs variable length coding using the relationship between the block Bk9 and the block Bkt. That is to say, in the case where the flag signals of the two blocks are the same, the supplementary information coding unit 303b assigns information, which reduces the coding amount the most, for the flag signal of the block Bkt.

To put it another way, the motion information MV represents a position which has the highest correlativity with the block Bkt in the reference picture FR1 which has been coded and then decoded. Thus, the flag signal, with high correlativity with the block Bkt, of the block RBk which has been coded and then decoded is identified based on the motion information of the block Bkt indicated by the flag signal to be coded. Since the correlativity between the block RBk and the block Bkt is high, there is a high probability that the flag signals of the two blocks Rbk and Bkt are the same. By utilizing such a high probability, it is possible to reduce the amount of information about a coded flag signal CFL.

Note that the supplementary information coding unit 303b of the variation predicts that the flag signal of the block Bkt is the same as the flag signal of the block Bk9; however, the supplementary information coding unit 303b may predict that the flag signal of the block Bkt is the same as another flag signal. For example, the block RBk includes a part of the blocks Bk1, Bk2, Bk3 and Bk9 in the reference picture FR1. In this case, the supplementary information coding unit 303b predicts that a flag signal (a median or an average value) calculated from the flag signals of these four blocks is the same as the flag signal of the block Bkt. Thus, it is possible to reduce increase in the coding amount in the case where there is variance among the flag signals.

(Variation 3)

The following describes the variation 3 of the third embodiment.

The image judgment unit according to the variation generates a flag signal based on a decoded image signal LDV and an input image signal VIN.

Figure 15:
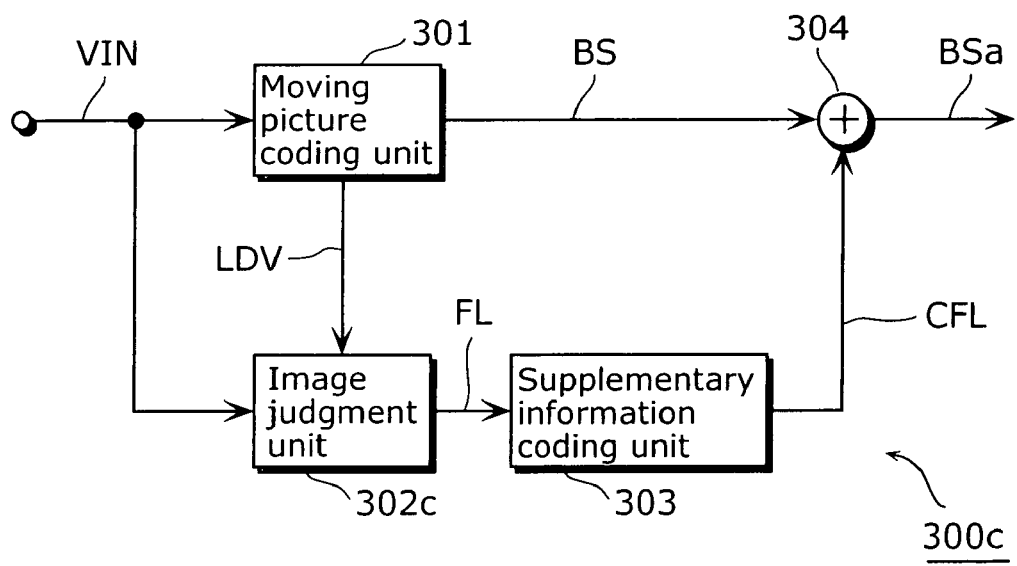
FIG. 15 is a block diagram showing the picture coding apparatus according to a variation 3 of the third embodiment.

FIG. 15 is a block diagram showing the picture coding apparatus of the variation.

A picture coding apparatus 300c of the variation includes an image judgment unit 302c which obtains a decoded image signal LDV and an input image signal VIN, instead of the image judgment unit 302 of the picture coding apparatus 300 in the embodiment.

The image judgment unit 302c calculates a difference image which is a difference between an image indicated by the input image signal VIN and an image indicated by the decoded image signal LDV, and sets a noise flag according to the frequency characteristics of the difference image.

Figure 16:
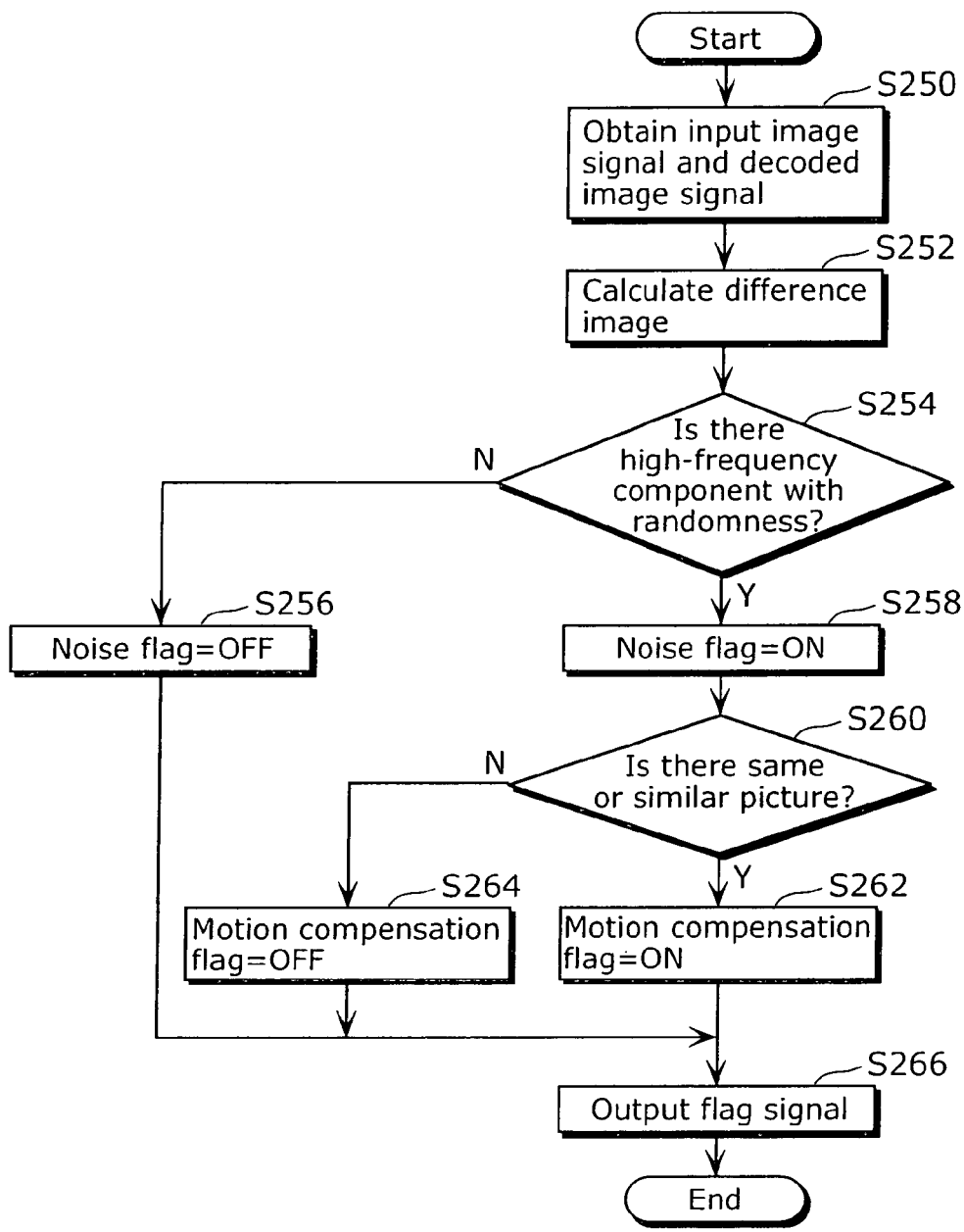
FIG. 16 is a flowchart showing the operation of the image judgment unit according to the variation 3 of the third embodiment.

FIG. 16 is a flowchart showing the operation of the image judgment unit 302c according to the variation.

First, the image judgment unit 302c obtains an input image signal VIN and a decoded image signal LDV (Step S250), and calculates, for each area (e.g. block or macroblock) in the pictures indicated by the input image signal VIN and the decoded image signal LDV, a difference between the images in the respective areas, as a difference image (Step S252).

Moreover, the image judgment unit 302c judges whether or not the difference picture has a high frequency component having randomness, each time a difference picture is calculated in Step S252 (Step S254). In the case of judging that the difference picture does not have such high frequency component (N in Step S254), the image judgment unit 302 sets a noise flag of the area corresponding to the difference picture to be OFF (Step S256). On the contrary, in the case of judging that the difference picture has such high frequency component (Y in Step S254), the image judgment unit 302 sets a noise flag of the area corresponding to the difference picture to be ON (Step S258).

Furthermore, the image judgment unit 302c judges whether or not the picture indicated by the already-obtained decoded image signal LDV includes an image similar to or as same as the image in the decoded image signal LDV (or the input image signal VIN), which corresponds to the area judged to have the high frequency component with randomness as described above (Step S260).

In the case of judging that the picture includes such an image (Y in Step S260), the image judgment unit 302c sets a motion compensation flag to be ON (Step S262), while in the case of judging that the picture does not include such an image (N in Step S260), the image judgment unit 302c sets a motion compensation flag to be OFF (Step S264).

Then, the image judgment unit 302c generates a flag signal FL indicating the noise flag and the motion compensation flag set in Steps S256, S258, S262 and S264, and outputs the flag signal FL (Step S266).

Note that, in the variation, the supplementary information coding unit 303 may obtain motion information MV from the moving picture coding unit 301, as is the case of the supplementary information coding unit 303b of the variation 2, and code the flag signal FL using the motion information MV. Thus, it is possible to further reduce the coding amount of a coded flag signal CFL.

Fourth Embodiment

The picture decoding apparatus according to the fourth embodiment of the present invention decodes a coded signal BSa generated by the picture coding apparatus of the third embodiment, as well as superimposes noise on a decoded picture through motion compensation.

Figure 17:
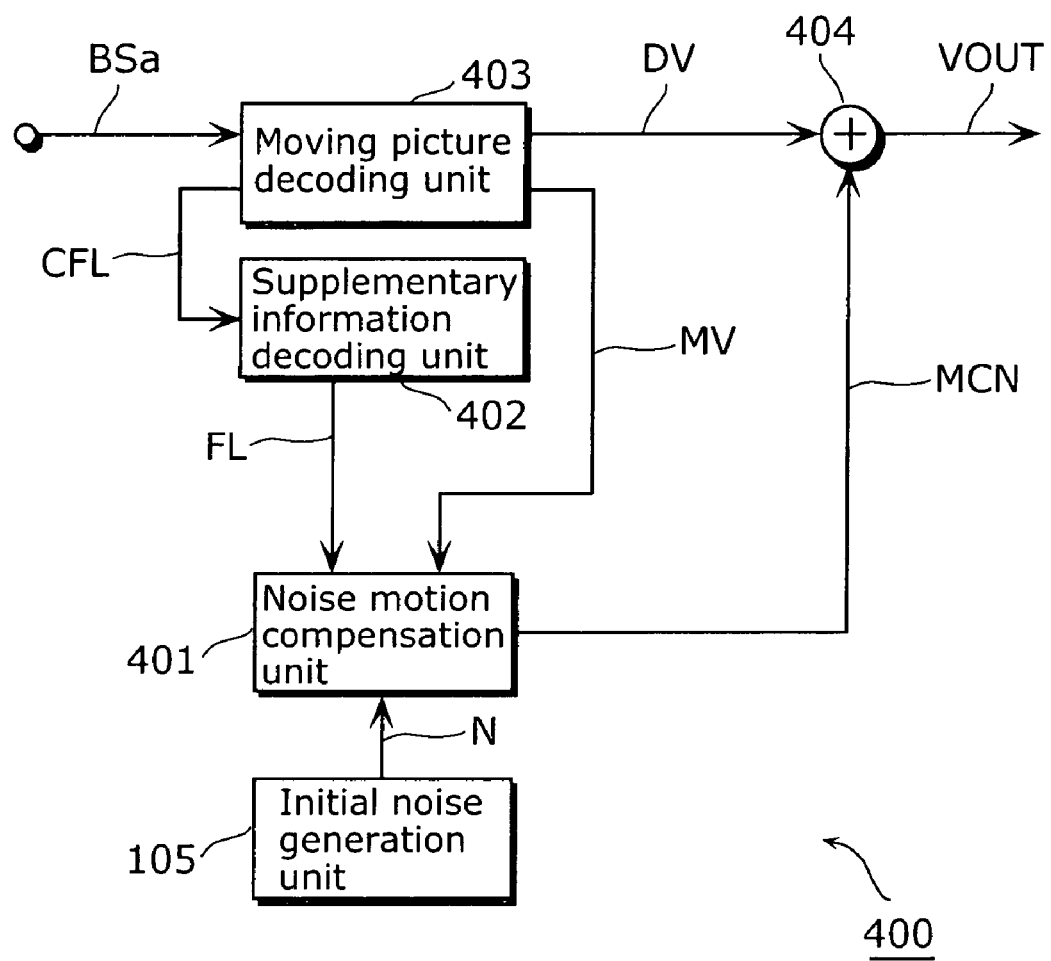
FIG. 17 is a block diagram showing a picture decoding apparatus according to a fourth embodiment of the present invention.

FIG. 17 is a block diagram showing the picture decoding apparatus according to the embodiment.

The picture decoding apparatus 400 of the embodiment includes a moving picture decoding unit 403, a supplementary information decoding unit 402, a noise motion compensation unit 401, an adder 404 and the initial noise generation unit 105.

The moving picture decoding unit 403 obtains a coded signal BSa, separates a coded flag signal CFL from the coded signal BSa, and outputs the separated coded flag signal CFL, as well as decodes a coded image signal BS included in the coded signal BSa. For example, in the case where the coded image signal BS is coded by the MPEG method, the moving picture decoding unit 403 performs variable length decoding, inverse quantization, inverse frequency transform, and other processing on the coded image signal BS so as to generate a difference picture, as well as generates a predictive picture from a picture that is already decoded and generates a decoded picture by adding the difference picture to the predictive picture. The moving picture decoding unit 403 then outputs a decoded image signal DV indicating the decoded picture. Note that the MPEG is just an example, and in the case where the coded image signal BS is coded by another method, the moving picture decoding unit 403 decodes a coded picture according to that method.

In addition, the moving picture decoding unit 403 performs decoding processing such as variable length decoding on the coded motion information MV included in the coded signal BSa, and outputs the decoded motion information MV.

The supplementary information decoding unit 402 obtains the coded flag signal CFL outputted from the moving picture decoding unit 403, and performs decoding processing such as variable length decoding on the coded flag signal CFL. Then, the supplementary information decoding unit 402 outputs the flag signal FL generated through the decoding process.

The initial noise generation unit 105 generates a noise signal N for superimposing the decoded image signal DV, and outputs the noise signal N.

The noise motion compensation unit 401 performs, for each area in a picture indicated by the decoded image signal DV, motion compensation for noise according to the noise flag and the motion compensation flag included in the flag signal FL outputted from the supplementary information decoding unit 402. In other words, in the case where the noise flag of the flag signal FL indicates ON and the motion compensation flag indicates OFF, the noise motion compensation unit 401 obtains the noise signal N outputted from the initial noise generation unit 105, and outputs the noise signal N as a motion-compensated noise flag MCN to be superimposed on the area in the picture indicated by the flag signal FL. On the other hand, in the case where the noise flag of the flag signal FL indicates ON and the motion compensation flag indicates ON, the noise motion compensation unit 401 shifts the noise used for superimposition in the past to the area in the picture indicated by the flag signal FL, based on the motion information MV outputted from the moving picture decoding unit

403. In other words, the moving picture decoding unit 403 performs motion compensation on the motion-compensated noise signal MCN used in the past. The moving picture decoding unit 403 then outputs the noise generated through the motion compensation as a new motion-compensated noise signal MCN. Also, when the noise flag of the flag signal FL indicates OFF, the noise motion compensation unit 401 stops the output of the motion-compensated noise flag signal MCN.

The adder 404 obtains the decoded image signal DV and the motion-compensated noise signal MCN, and superimposes the motion-compensated noise signal MCN onto the decoded image signal DV. In other words, the adder 404 superimposes, for each area in the picture indicated by the picture decoded signal DV, the noise indicated by the motion-compensated noise signal MCN on an image in that area. Then, the adder 404 outputs the decoded image signal DV on which the motion-compensated noise signal MCN has been superimposed, as an output image signal VOUT.

Figure 18:
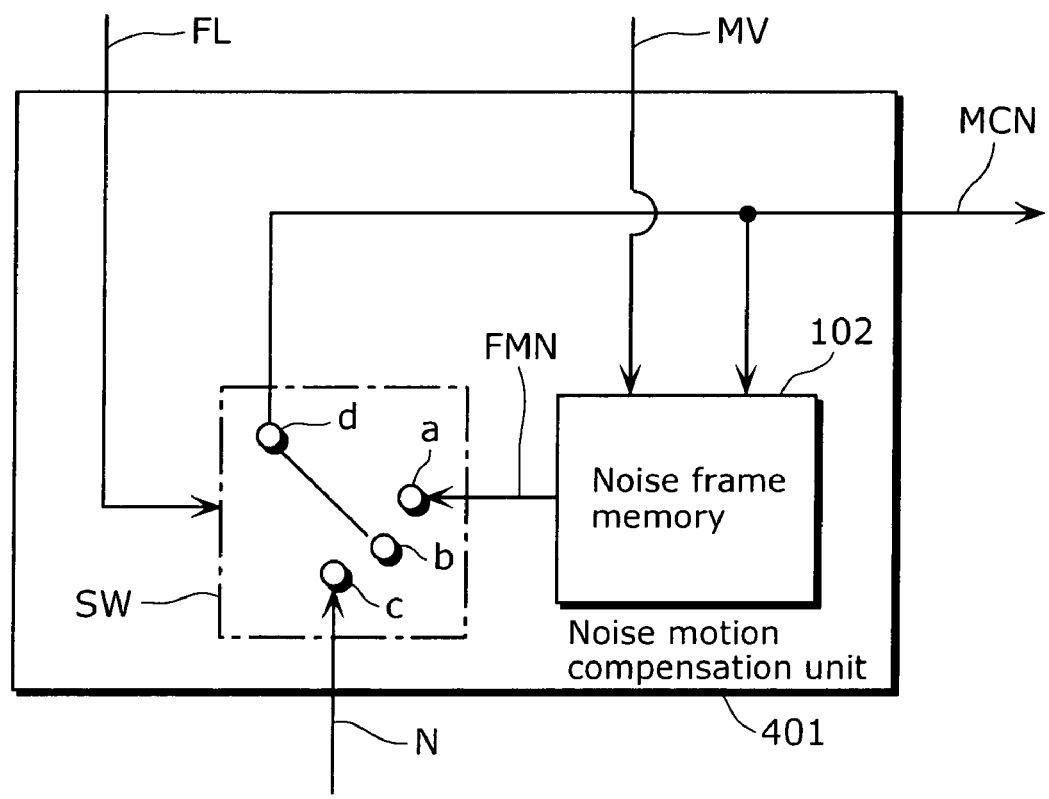
FIG. 18 is a block diagram showing a noise motion compensation unit according to the fourth embodiment.

FIG. 18 is a block diagram showing the noise motion compensation unit 401 according to the embodiment.

The noise motion compensation unit 401 includes a switch SW and the noise frame memory 102.

The switch SW switches a terminal d to either of terminals a, b and c according to the flag signal FL for connection. That is to say, when the noise flag of the flag signal FL indicates ON and the motion compensation flag indicates ON, the switch SW connects the terminal d to the terminal a and sets the state so that a motion-compensated noise signal MCN is outputted from the noise frame memory 102. With this setting, motion compensation is performed. When the noise flag of the flag signal FL indicates ON and the motion compensation indicates OFF, the switch SW connects the terminal d to the terminal c and sets the state so that the noise signal N outputted from the initial noise generation unit 105 is outputted as a motion-compensated noise signal MCN. When the noise flag of the flag signal FL indicates OFF, the switch SW connects the terminal d to the terminal b and sets the state so that a motion-compensated noise signal MCN is not outputted from the noise motion compensation unit 401.

The noise frame memory 102 stores the motion-compensated noise signals MCN already used for superimposition. After obtaining motion information MV, the noise frame memory 102 extracts the motion-compensated noise signal MCN of the area indicated by the motion information MV from among the motion-compensated noise signals MCN stored in the frame memory 102, and outputs the extracted motion-compensated noise signal MCN. In other words, the noise motion compensation unit 401 performs motion compensation on the motion-compensated noise signals MCN stored in the noise frame memory 102. Moreover, the noise frame memory 102 newly stores the motion-compensated noise signals MCN outputted as described above, as the motion-compensated noise signal MCN of a current area to be processed.

Figure 19:
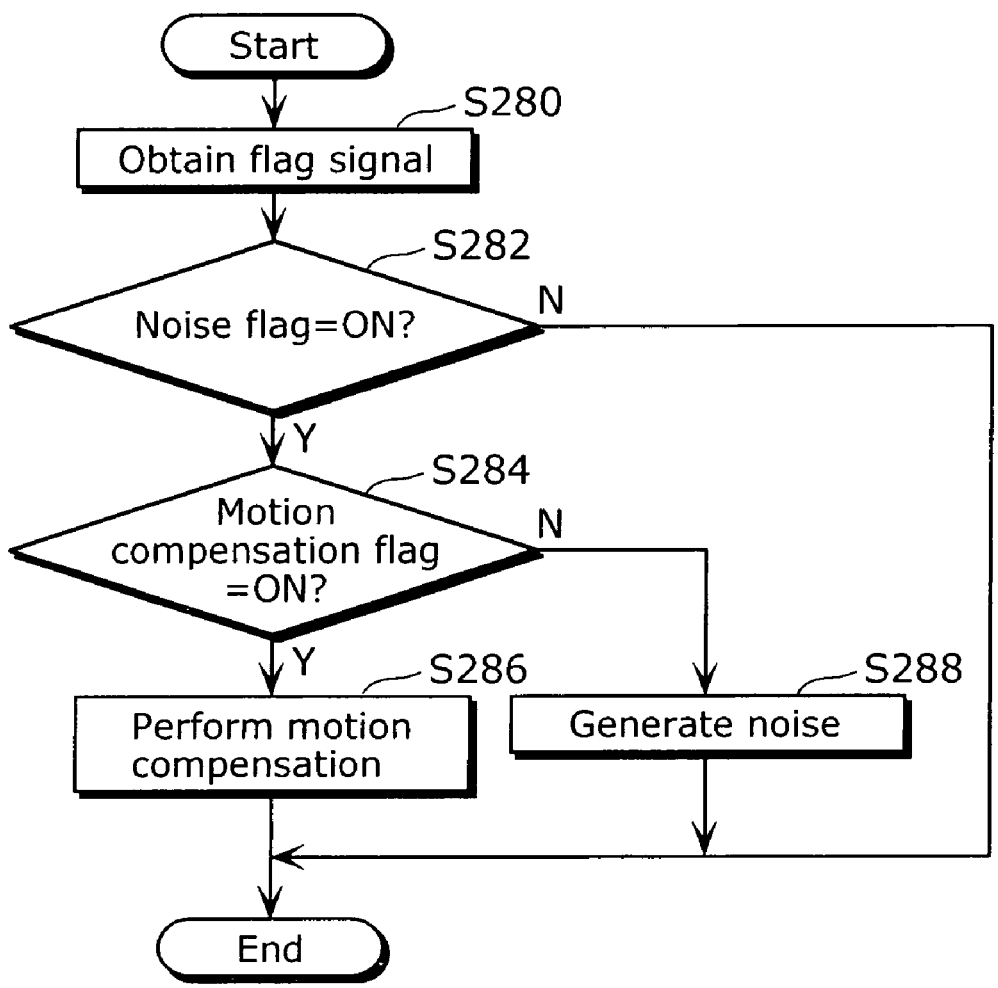
FIG. 19 is a flowchart showing the operation of the noise motion compensation unit according to the fourth embodiment.

FIG. 19 is a flowchart showing the operation of the noise motion compensation unit 401 according to the embodiment.

The noise motion compensation unit 401 first obtains a flag signal FL (Step S280), and judges whether or not a noise flag included in the flag signal FL indicates ON (Step S282).

In the case of judging that the noise flag indicates ON (Y in Step S282), the noise motion compensation unit 401 further judges whether or not a motion compensation flag included in the flag signal FL indicates ON (Step S284). In the case of judging that the motion compensation flag indicates ON (Y in Step S284), the noise motion compensation unit 401 outputs the motion-compensated noise signal MCN from the noise frame memory 102 so as to perform motion compensation on the noise (Step S286). In the case of judging that the motion compensation flag indicates OFF (N in Step S284), the noise motion compensation unit 401 newly generates noise and outputs the noise as the motion-compensated noise signal MCN (Step S288). In other words, the noise motion compensation unit 401 outputs the noise signal N generated by the initial noise generation unit 105, as the motion-compensated noise signal MCN.

In this way, according to the embodiment, it is possible to decode the coded signal BSa generated by the picture coding apparatus of the third embodiment, and to appropriately superimpose noise on a decoded picture through motion compensation according to the flag signal FL included in the coded signal BSa.

Note that, in the embodiment, the supplementary information decoding unit 402 may decode a coded flag signal CFL using the motion information MV outputted from the moving picture decoding unit 403. Namely, in the case where the coded signal BSa is generated by the picture coding apparatus 300*b* according to the variation 2 of the third embodiment, a flag signal FL is coded using motion information MV.

Also, the adder 404 may superimpose noise on a picture indicated by the decoded image signal DV by adding a pixel value K indicated by the motion-compensated noise signal MCN to a pixel value J indicated by the decoded image signal DV. Alternatively, the adding operation may be performed after transforming, by means of function, the pixel value K indicated by the motion-compensated noise signal MCN. For instance, the level of the noise indicated by the motion-compensated noise signal MCN can be suppressed by adding a square root or a cube root of the pixel value K.

For example, in the case where a predetermined area is intra-coded and the noise motion compensation unit 401 could not obtain the motion information MV for that area from the moving picture decoding unit 403, the noise motion compensation unit 401 may output the noise signal N outputted from the initial noise generation unit 105, as the motion-compensated noise signal MCN, without performing motion compensation.

(Variation)

The following describes a variation of the embodiment.

The picture decoding apparatus according to the variation further adjusts the level of noise based on the information included in a coded signal, and superimposes the adjusted noise on a decoded picture.

Figure 20:
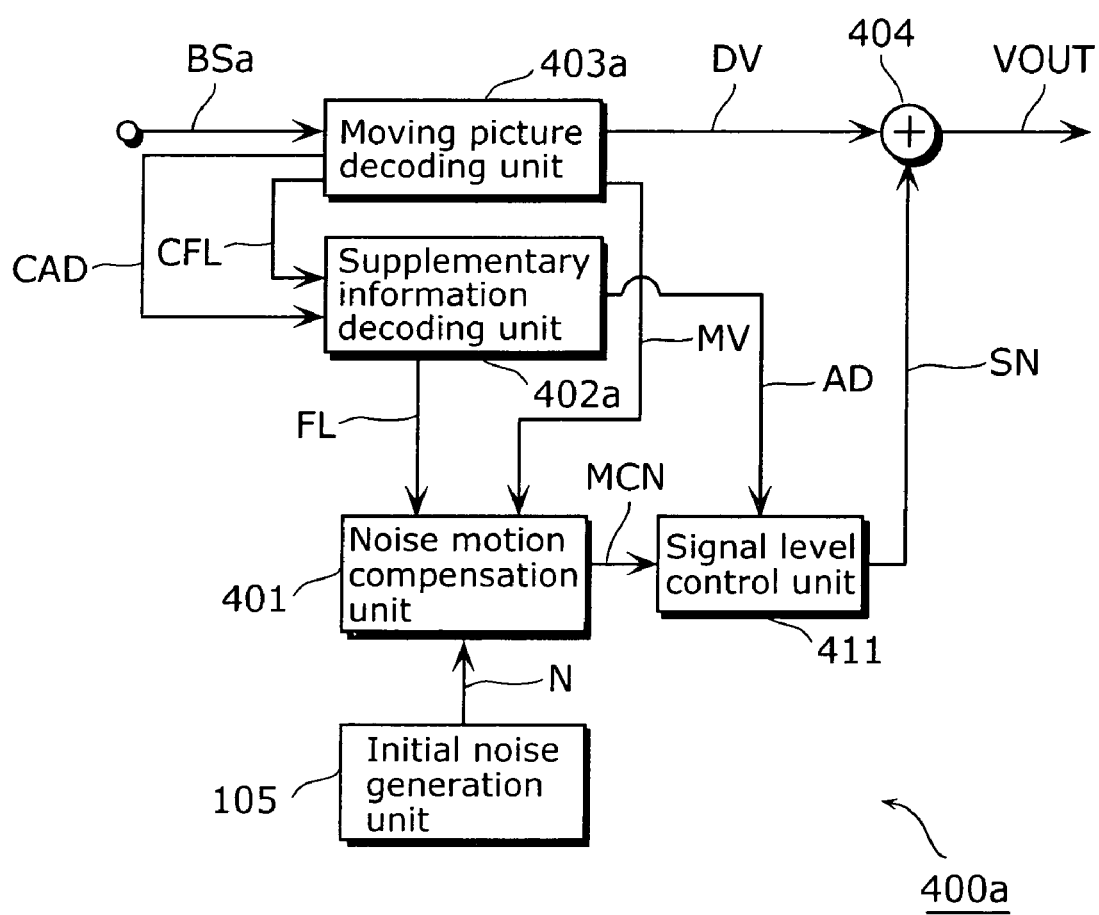
FIG. 20 is a block diagram showing the picture decoding apparatus according to a variation of the fourth embodiment.

FIG. 20 is a block diagram showing the picture decoding apparatus according to the variation.

A picture decoding apparatus 400*a* of the variation includes a moving picture decoding unit 403*a*, a supplementary information decoding unit 402*a*, the noise motion compensation unit 401, the initial noise generation unit 105, a signal level control unit 411 and the adder 404.

The moving picture decoding unit 403*a* obtains a coded signal BSa which includes a coded adjustment signal CAD for adjusting the level of noise. The moving picture decoding unit 403*a* then separates the coded adjustment signal CAD and a coded flag signal CFL from the coded signal BSa and outputs the separated signals CAD and CFL. Moreover, the moving picture decoding unit 403*a* decodes the coded image signal BS included in the coded signal BSa into a decoded image signal DV and outputs the decoded image signal DV, and also decodes the coded motion information MV included in the coded signal BSa and outputs the decoded motion information MV, as does the moving picture decoding unit 403 of the above-described embodiment.

The supplementary information decoding unit 402a obtains the coded flag signal CFL and the coded adjustment signal CAD outputted from the moving picture decoding unit 403a, and performs decoding processing such as variable length decoding on these signals. As a result of the decoding process, the supplementary information decoding unit 402a outputs a flag signal FL to the noise motion compensation unit 401 as well as outputs an adjustment signal AD to the signal level control unit 411.

The signal level control unit 411 performs level adjustment on the motion-compensated noise signal MCN outputted from the noise motion compensation unit 401, so that the level of noise is adjusted according to the adjustment signal AD outputted from the supplementary information decoding unit 402a. The signal level control unit 411 generates a superimposition noise signal SN indicating the noise adjusted through such level adjustment and outputs the superimposition noise signal SN. Thus, the level of the noise to be superimposed on a decoded picture is adjusted according to the information indicated by the coded signal BSa. Note that the range of noise level is previously determined, and in the case where the noise level indicated by the adjustment signal AD exceeds the range, the signal level control unit 411 performs level adjustment on the motion-compensated noise signal MCN so that the level of the noise to be superimposed on a coded picture does not go beyond the limit of the range.

The adder 404 superimposes the superimposition noise signal SN outputted from the signal level control unit 411, onto the decoded image signal DV outputted from the moving picture decoding unit 403a, and outputs the decoded image signal DV on which the superimposition noise signal SN has been superimposed, as an output image signal VOUT. That is to say that the noise indicated by the superimposition noise signal SN is superimposed on each superimposition area in a decoded picture, which is indicated by the decoded image signal DV.

Figure 21:
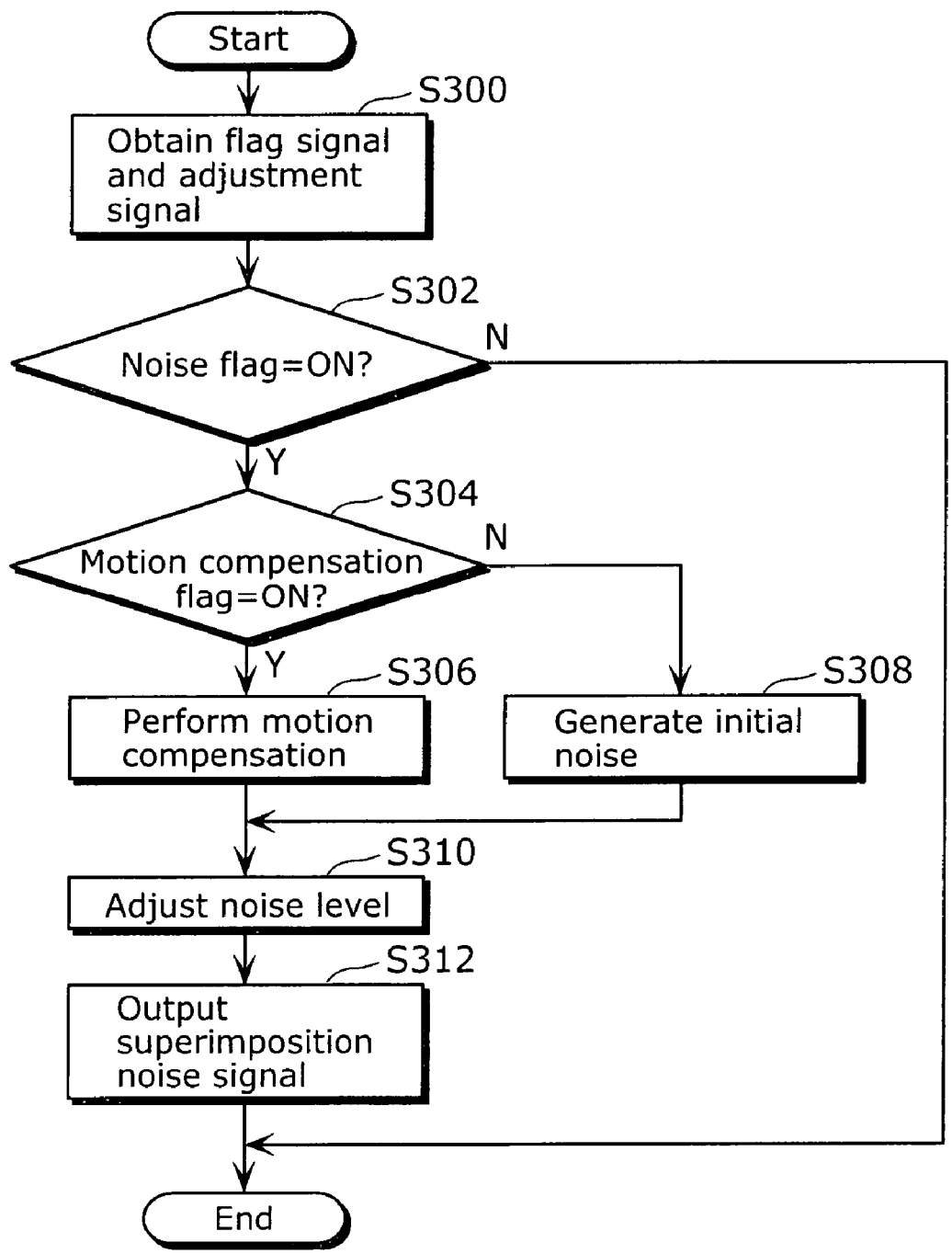
FIG. 21 is a flowchart showing the operation of a noise motion compensation unit and a signal level control unit according to the variation of the fourth embodiment.

FIG. 21 is a flowchart showing the operations of the noise motion compensation unit 401 and the signal level control unit 411 according to the variation.

First, the noise motion compensation unit 401 obtains the flag signal FL and the signal level control unit 411 obtains the adjustment signal AD (Step S300).

The noise motion compensation unit 401 judges whether or not a noise signal included in the flag signal FL indicates ON (Step S302). In the case of judging that the noise signal indicates ON (Y in Step S302), the noise motion compensation unit 401 further judges whether or not a motion compensation flag included in the flag signal FL indicates ON (Step S304). In the case of judging that the motion compensation flag indicates ON (Y in Step S304), the noise motion compensation unit 401 outputs a motion-compensated noise signal MCN from the noise frame memory 102 so as to perform motion compensation on the noise (Step S306). In the case of judging that the motion compensation flag indicates OFF (N in Step S304), the noise motion compensation unit 401 newly generates noise and outputs the noise as the motion-compensated noise signal MCN (Step S308).

The signal level control unit 411 performs level adjustment on the motion-compensated noise signal MCN outputted in Steps S306 and S308, according to the adjustment signal AD obtained in Step S300 (Step S310). The signal level control unit 411 then outputs a superimposition noise signal SN indicating the noise for which the level has been adjusted (Step S312).

Note that the noise motion compensation unit according to the embodiment has a switch SW; however, the noise motion compensation unit may not have a switch SW. In this case, a signal level control unit has a switch SW.

Figure 22:
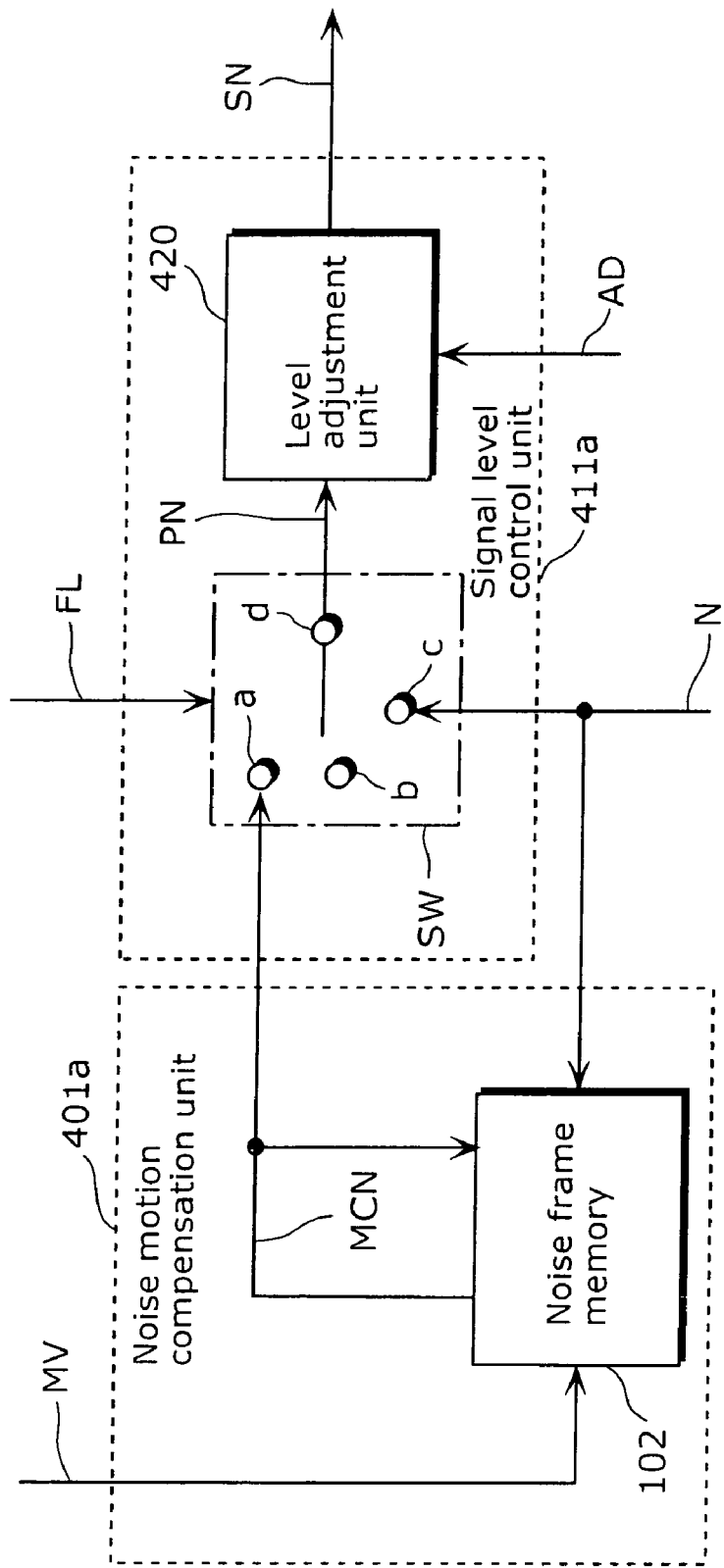
FIG. 22 is a diagram showing the compositions of the noise motion compensation unit without switch and the signal level control unit with switch, according to the variation of the fourth embodiment.

FIG. 22 is a diagram showing the configurations of a noise motion compensation without a switch SW and a signal level control unit with a switch SW, respectively.

The noise motion compensation unit 401a does not include a switch SW, but includes only the noise frame memory 102. Therefore, the noise motion compensation unit 401a extracts and outputs, for all the areas in a decoded picture, the motion-compensated noise signal MCN of the area indicated by the motion information MV from among the motion-compensated noise signals MCN stored in the noise frame memory 102, without switching the operation according to the flag signal FL. The noise motion compensation unit 401a also stores a motion-compensated noise signal MCN outputted for each area, as the motion-compensated noise signal MCN of that area.

The signal level control unit 411a includes a switch SW and a level adjustment unit 420.

The switch SW switches, as described above, a terminal d to either of terminals a, b and c for connection according to a flag signal FL. When the terminal d is connected to the terminal a, the motion-compensated noise signal MCN from the noise frame memory 102 is outputted to the level adjustment unit 420 as a provisional superimposition noise signal PN. When the terminal d is connected to the terminal c, the noise signal N from the initial noise generation unit 105 is outputted to the level adjustment unit 420 as a provisional superimposition noise signal PN. When the terminal d is connected to the terminal c, the output of the provisional superimposition noise signal PN to the level adjustment unit 420 is stopped.

The level adjustment unit 420 performs level adjustment on the provisional superimposition noise signal PN outputted from the switch SW, so that the level of the noise is adjusted according to the adjustment signal AD outputted from the supplementary information decoding unit 402a. The level adjustment unit 420 transforms the provisional superimposition noise signal PN to the superimposition noise signal SN through such level adjustment.

In this way, according to the embodiment, in the case where an adjustment signal AD is coded and included in a coded signal BSa, it is possible to adjust the level of noise according to the adjustment signal AD, and therefore can further improve picture quality.

Fifth Embodiment

Furthermore, storing, into a recording medium such as a flexible disc, a program for realizing the processing performed by the moving picture processing method, the picture coding method, or the picture decoding method shown in the above-mentioned first to fourth embodiments enables easy implementation, in an independent computer system, of the processing performed by the respective method shown in each of the embodiments.

Figure 23A:
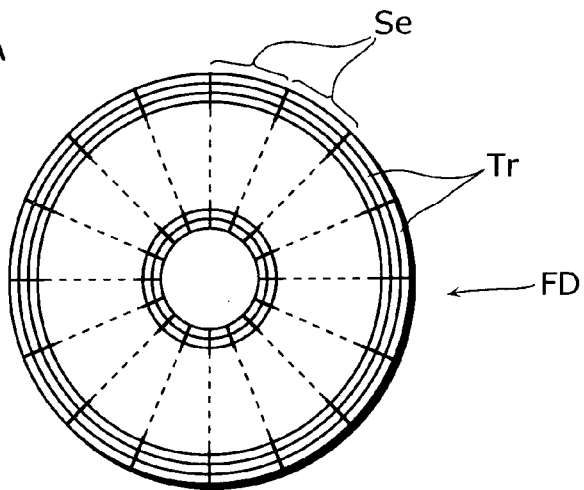
FIG. 23A is an illustration showing the case of implementing the processing according to the present invention in a computer system, using the flexible disk described in a fifth embodiment of the present invention.
Figure 23B:
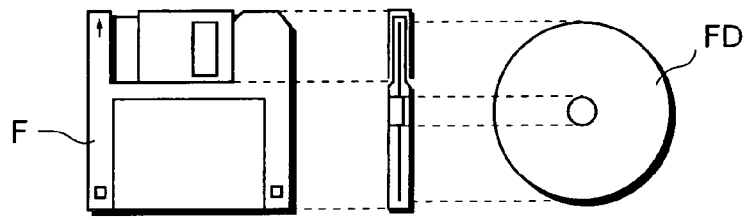
FIG. 23B is another illustration showing the case of implementing the processing according to the present invention in a computer system, using the flexible disk described in the fifth embodiment.
Figure 23C:
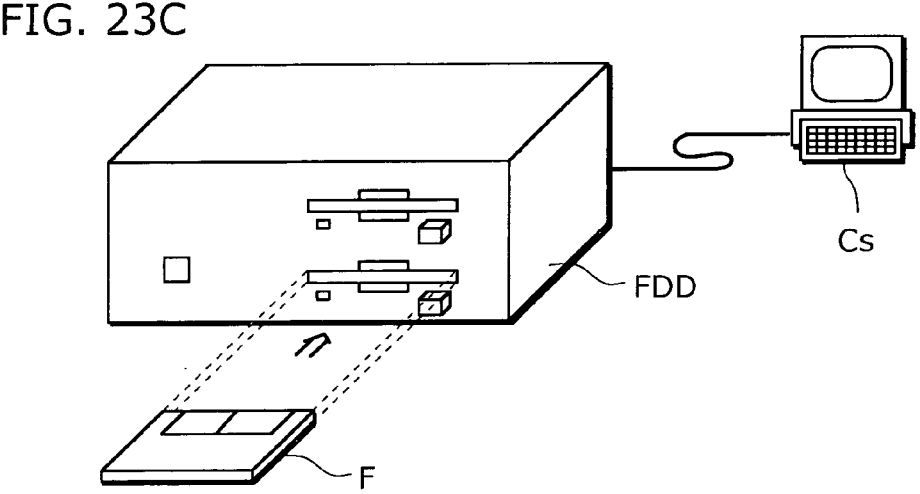
FIG. 23C is yet another illustration showing the case of implementing the processing according to the present invention in a computer system, using the flexible disk described in the fifth embodiment.

FIGS. 23A to 23C are schematic diagrams for showing the case where the processing performed by the respective method described in the above-mentioned first to fourth embodiments is executed in a computer system using a flexible disc.

FIG. 23B shows a front view, a lateral view of a flexible disc contained in a case, and a flexible disc, whereas FIG. 23A shows an example of a physical format of a flexible disc which is a storage media. A flexible disc FD is contained in a case F, a plurality of tracks Tr are formed concentrically on the surface of the disc from the periphery toward the inner radius of the disc, and each track is divided into 16 sectors Se in the angular direction. Therefore, in the case of the flexible disc storing the above-mentioned program, the program is recorded in an area allocated on the flexible disc FD.

FIG. 23C shows a configuration for recording and reproducing the program on the flexible disc FD. In the case of recording the program on the flexible disc FD, the computer system Cs writes data as the program in a computer system Cs via a flexible disc drive. In the case of implementing, in the computer system, the functions of the respective methods described above by the program in the flexible disc, the program is read out from the flexible disc through the flexible disc drive, and then transferred to the computer system Cs.

The above description is provided on an assumption that a storing medium is a flexible disc, but the same processing can also be performed using an optical disc. In addition, the storing medium is not limited to a flexible disc and an optical disk, and any other medium such as an IC card and a ROM cassette can be used provided that a program can be recorded therein.

The following describes application examples of the moving picture processing method, the picture coding method and the picture decoding method which are described in the above embodiments, as well as a system using such methods.

Figure 24:
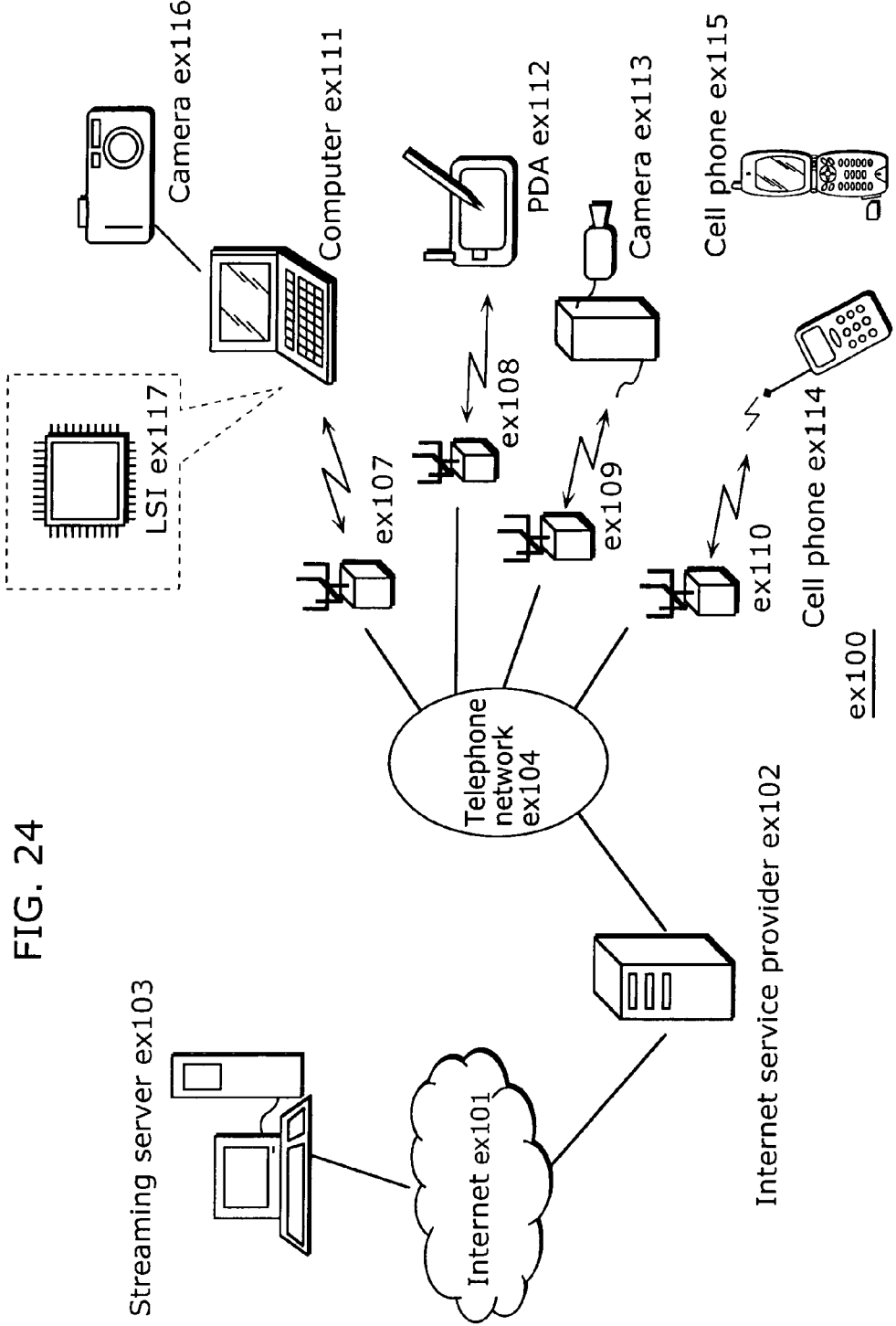
FIG. 24 is a block diagram showing an overall configuration of a content distribution system which realizes the content distribution services described in a sixth embodiment.

FIG. 24 is a block diagram showing an overall configuration of a content provision system ex100 for realizing content distribution services. The area for providing communication service is divided into cells of desired size, and cell sites ex107 to ex110 which are fixed wireless stations placed in the respective cells.

This content supply system ex100 is connected, via an Internet ex101, an Internet service provider ex102, a telephone network ex104 and cell sites ex107 through ex110, to devices such as a computer ex111, a Personal Digital Assistant (PDA) ex112, a camera ex113, a cell phone ex114 and a cell phone with a camera ex115.

However, the content supply system ex100 is not limited to the configuration as shown in FIG. 24 and may be connected to a combination of any of them. Also, each device may be connected directly to the telephone network ex104, in stead of via the cell sites ex107 to ex110.

The camera ex113 is a device capable of shooting video such as a digital video camera. The cell phone may be a cell phone of a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS) or the like.

A streaming server ex103 is connected to the camera ex113 via the telephone network ex104 and the cell site ex109, which realizes a live distribution or the like based on the coded data transmitted from the user using the camera ex113. Either the camera ex113 or the server which transmits the data may code the data obtained through shooting. Also, the video data shot by a camera ex116 may be transmitted to the streaming server ex103 via the computer ex111. In this case, either the camera ex116 or the computer ex111 may code the video data. An LSI ex117 included in the computer ex111 or the camera ex116 actually performs coding processing. Software for coding and decoding pictures may be integrated into any type of storage medium (such as a CD-ROM, a flexible disc and a hard disk) that is a recording medium which is readable by the computer ex111 or the like. Furthermore, the cell phone with a camera ex115 may transmit the video data. The video data here is the data coded by an LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 distributes streams of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce real-time the data so as to realize personal broadcasting.

The moving picture processing method, the picture coding apparatus and the picture decoding apparatus as described in the above-mentioned embodiments can be used for moving picture processing, coding and decoding performed by each of the devices configuring this system.

A cell phone will be used as an example of such a device.

Figure 25:
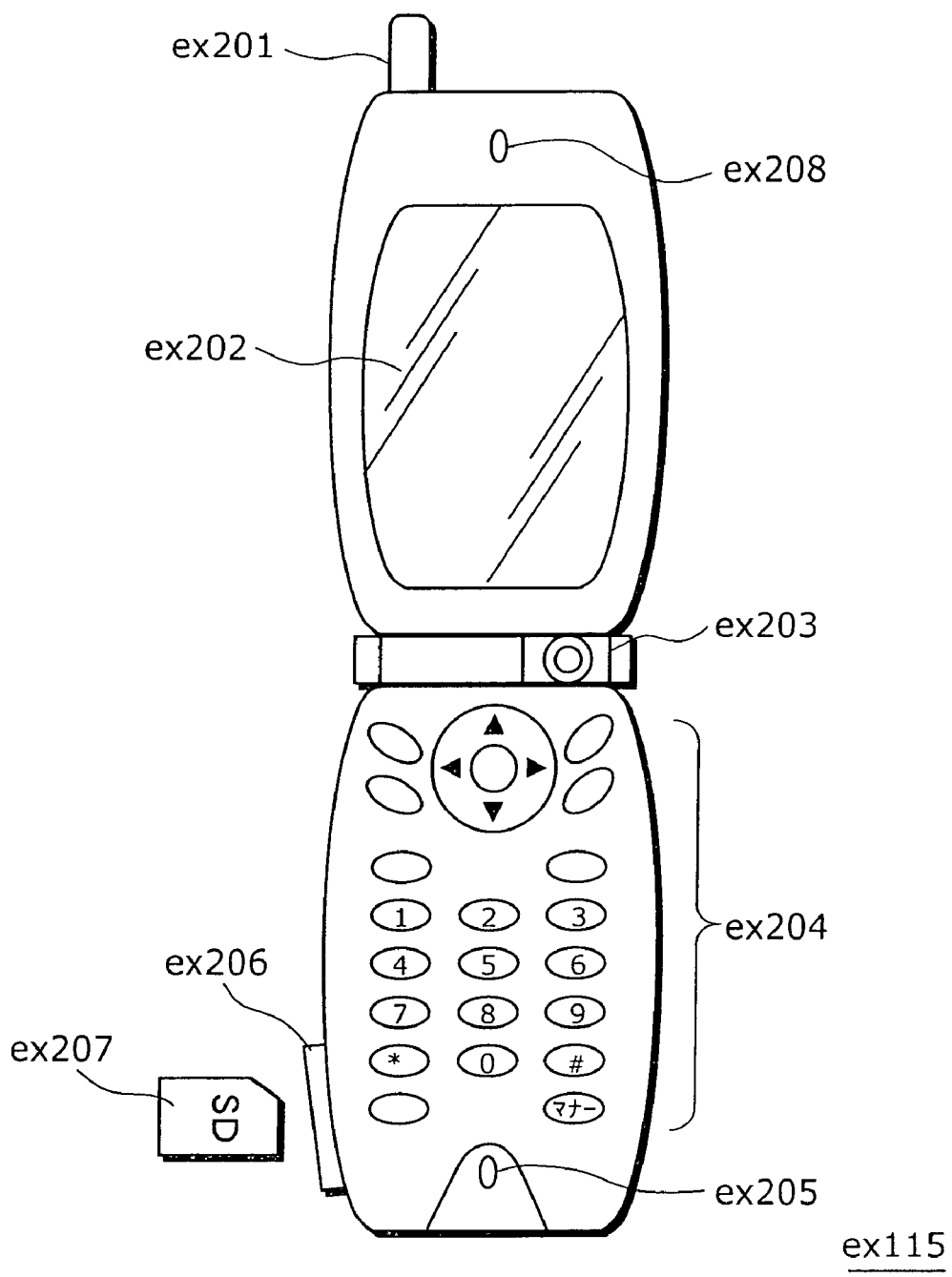
FIG. 25 is an illustration showing a cell phone which uses the method described in the sixth embodiment of the present invention.

FIG. 25 is a diagram showing the cell phone ex115 using the moving picture processing method, the picture coding method and the picture decoding method described in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mails and data of moving or still pictures, and a slot unit ex206 for attaching the storage medium ex207 to the cell phone ex115. The storage medium ex207 stores in itself a flash memory element, a kind of Electrically Erasable and Programmable Read Only Memory (EEPROM) that is a nonvolatile memory electrically erasable from and rewritable to a plastic case such as a SD card.

Moreover, the cell phone ex115 will be described with reference to FIG. 26. In the cell phone ex115, a main control unit ex311, designed in order to control each unit of the main body configured of the display unit ex202 as well as the operation keys ex204, is connected mutually to a power supply circuit unit ex310, an operation input control unit ex304, a picture coding unit ex312, a camera interface unit ex303, an Liquid Crystal Display (LCD) control unit ex302, a picture decoding unit ex309, a demultiplexing unit ex308, a recording/reproducing unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the camera attached digital cell phone ex115 to be operable.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing of the digital voice data, and the communication circuit unit ex301 performs digital-to-analog conversion and frequency transform of the data, so as to transmit it via the antenna ex201. Also, in the cell phone ex115, the communication circuit unit ex301 amplifies the data received by the antenna ex201 in conversation mode and performs frequency transform and analog-to-digital conversion to the data, the modem circuit unit ex306 performs inverse spread spectrum processing of the data, and the voice processing unit ex305 converts it into analog voice data, so as to output the converted data via the voice output unit 208.

Furthermore, in the case of sending an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform to it, the data is transmitted to the cell site ex110 via the antenna ex201.

In the case of transmitting picture data in data communication mode, the picture data shot by the camera unit ex203 is supplied to the picture coding unit ex312 via the camera interface unit ex303. In the case of not transmitting the picture data, it is also possible to display the picture data shot by the camera unit ex203 directly on the display unit 202 via the camera interface unit ex303 and the LCD control unit ex302.

The picture coding unit ex312, which includes the picture coding apparatus as described as the present invention, compresses and codes the picture data supplied from the camera unit ex203 by the coding method used for the picture coding apparatus as shown in the above-mentioned embodiments, so as to transform the picture data into coded picture data, and sends it to the demultiplexing unit ex308. At the time, the cell phone ex115 sends the voices received by the voice input unit ex205 during the shooting with the camera unit ex203 to the demultiplexing unit ex308 as digital voice data via the voice processing unit ex305.

The demultiplexing unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the communication circuit unit ex301 performs digital-to-analog conversion and frequency transform of the data for the transmission via the antenna ex201.

In the case of receiving data of a video file which is linked to a Web page or the like in data communication mode, the modem circuit unit ex306 performs inverse spread spectrum processing of the data received from the cell site ex110 via the antenna ex201, and sends the multiplexed data obtained as a result of the processing to the demultiplexing unit ex308.

In order to decode the multiplexed data received via the antenna ex201, the demultiplexing unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as described as the present invention, decodes the bit stream of picture data by the decoding method corresponding to the coding method as shown in the above-mentioned embodiments, to generate reproduced video data, and supplies this data to the display unit ex202 via the LCD control unit ex302, and thus picture data included in a video file linked to a Web page, for instance, is displayed. At the same time, the voice processing unit ex305 converts the voice data into analog voice data, and supplies this data to the voice output unit ex208, and thus voice data included in the video file linked to a Web page, for instance, is reproduced.

Figure 27:
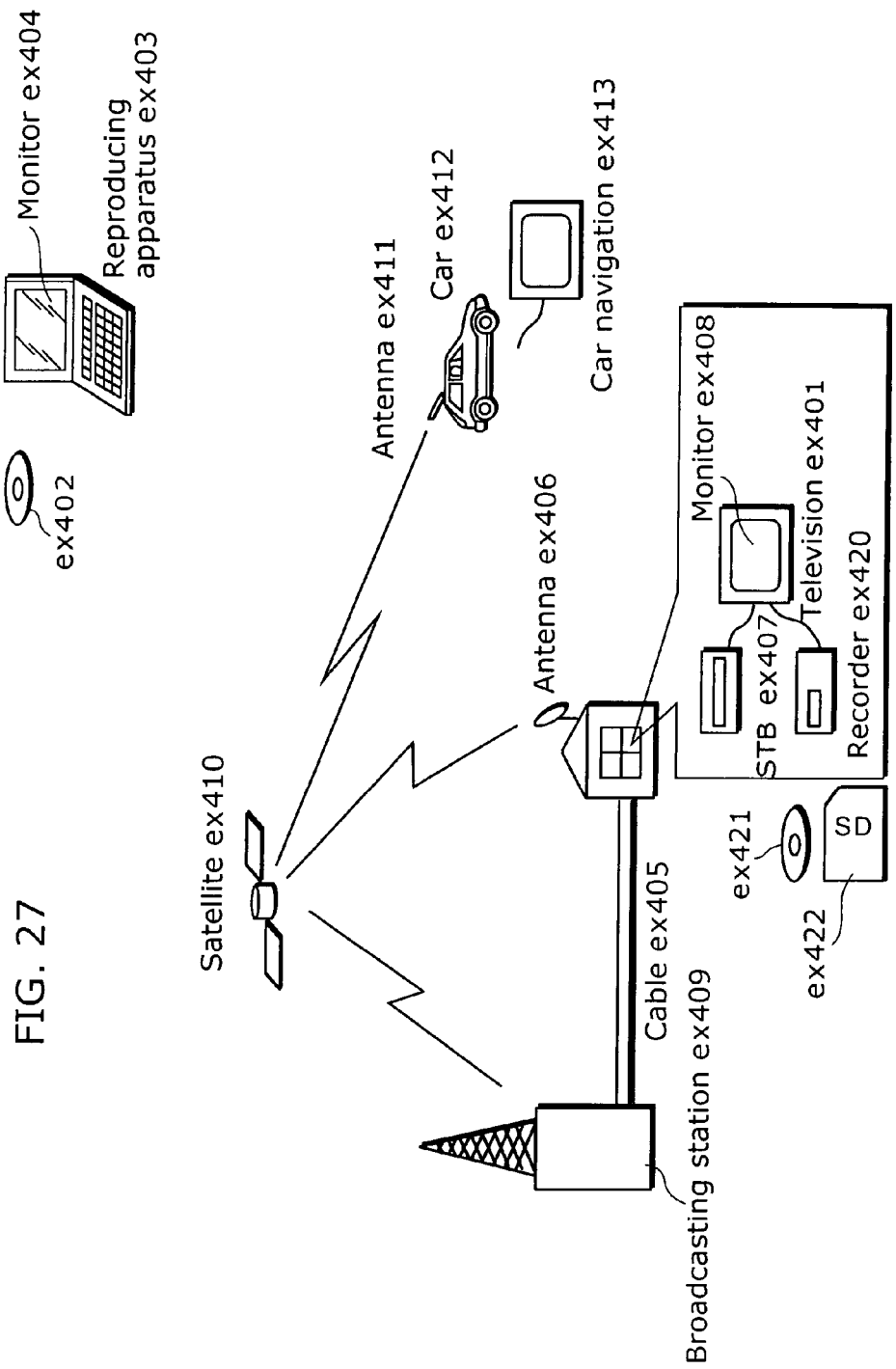
FIG. 27 is a diagram showing an example of the digital broadcasting system according to the sixth embodiment.

The present invention is not limited to the above-mentioned system, and either the picture coding apparatus or the picture decoding apparatus described in the above-mentioned embodiments can be incorporated into a digital broadcasting system, as shown in FIG. 27. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes the bit stream for reproduction. The picture decoding apparatus as shown in the above-mentioned embodiment can be implemented in the reproducing device ex403 which reads out and decodes the bit stream recorded on a storage medium ex402 that is a recording medium such as a CD and a DVD. In this case, the reproduced video signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Also, a car ex412 having an antenna ex411 can receive signals from the satellite ex410 or the cell site ex107 for reproducing video on a display device such as a car navigation system ex413.

Furthermore, the picture coding apparatus as shown in the above-mentioned embodiments can code picture signals and record the coded signals on a recording medium. As a concrete example, there is a recorder ex420 such as a DVD recorder for recording picture signals on a DVD disk ex421 and a disk recorder for recording picture signals on a hard disk. They can be recorded on an SD card ex422. If the recorder ex420 includes the picture decoding apparatus as shown in the above-mentioned embodiments, the picture signals recorded on the DVD disk ex421 or the SD card ex422 can be reproduced for display on the monitor ex408.

Figure 26:
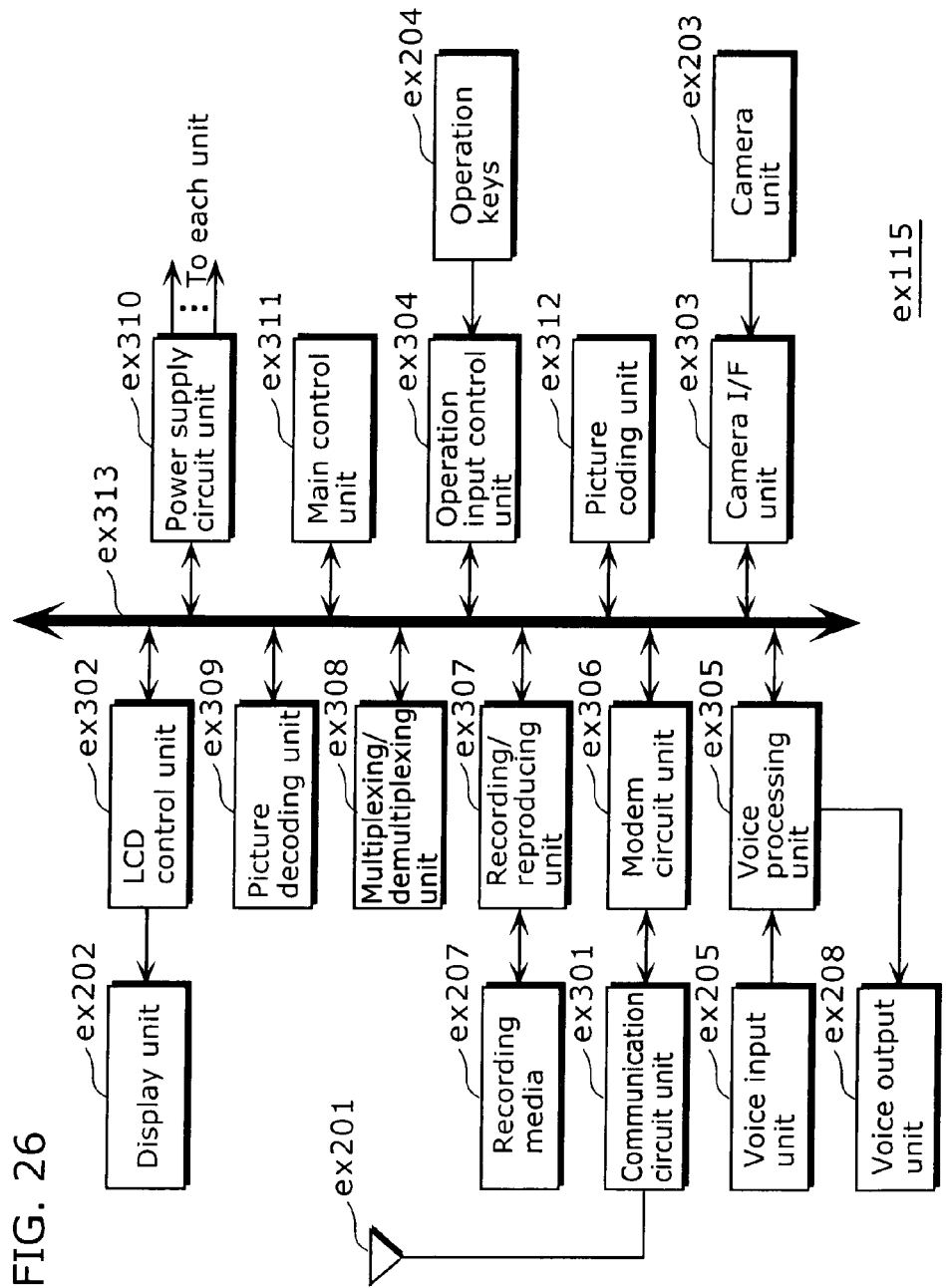
FIG. 26 is a block diagram showing the cell phone according to the sixth embodiment.

As for the configuration of the car navigation system ex413, the configuration without the camera unit ex203, the camera interface unit ex303 and the picture coding unit ex312, out of the components shown in FIG. 26, is conceivable. The same applies to the computer ex111, the television (receiver) ex401 and others.

In addition, three types of implementations are conceivable for a terminal such as the cell phone ex114; a sending/receiving terminal equipped with both an encoder and a decoder, a sending terminal equipped with an encoder only, and a receiving terminal equipped with a decoder only.

Thus, the moving picture processing method, the picture coding method and the picture decoding method shown in the above-mentioned embodiments can be used in any of the devices or systems described above, and thus the effects described in the embodiments can be achieved.

Note that each of the function blocks in the block diagrams (FIG. 1, FIG. 7, FIG. 10 and FIG. 17) are typically realized as an LSI that is an integrated circuit device. The LSI may be integrated in a single chip or in several chips (for example, the function blocks other than a memory may be implemented in a single chip).

Depending on the level of integration, an LSI may be called an IC, a system LSI, a super LSI or an ultra LSI.

The method of integration is not limited to such LSI, and can be realized by a private circuit or a general processor. Instead, a Field Programmable Gate Array (FPGA) that can store programs after the manufacturing of LSI, or a configurable processor that can reconfigure connection and setting of a circuit cell included in an LSI may be used instead.

With the arrival of new technology for the integration of components into a chip, which replaces LSI due to the progress in semiconductor technique or to another technique deriving from it, the function blocks can be surely integrated using such new technology. The application of biotechnology is one of such possibilities.

Also, among the function blocks, the units to store data to be coded or decoded may be configured separately instead of being integrated into a chip.

The present invention should not be limited to the first to sixth embodiments and the variations. The processes described in these embodiments and variations may be combined without any inconsistency, and various modifications and corrections are possible without deviation from the range of the present invention.

INDUSTRIAL APPLICABILITY

The moving picture processing method of the present invention is effective in improving the subjective image quality perceived by the viewers, and is applicable to a mobile phone, a Digital Versatile Disk (DVD) device, a personal computer, and etc.

The invention claimed is:

1. A moving picture processing method for superimposing noise on a moving picture, said method comprising:
shifting a first noise which has been used for superimposition on a moving picture, in accordance with a motion of the moving picture;
superimposing the shifted first noise onto a moving picture that appears after the motion has occurred; and
specifying a superimposition area, on which noise is to be superimposed, in a current picture to be processed which is included in the moving picture,
wherein said shifting of the first noise includes shifting the first noise in accordance with a motion of an image in the superimposition area, and
said superimposing of the shifted first noise includes superimposing the shifted first noise onto the superimposition area.

2. The moving picture processing method according to claim 1,
wherein said specifying of the superimposition area includes
specifying the superimposition area based on frequency components in the current picture.

3. The moving picture processing method according to claim 1,
wherein said shifting of the first noise includes:
estimating the motion of the image in the superimposition area; and
shifting the first noise according to the estimated motion.

4. The moving picture processing method according to claim 1, further comprising
obtaining a moving picture signal including the moving picture,
wherein said shifting of the first noise includes:
extracting, from the moving picture signal, motion information indicating the motion of the image in the superimposition area; and
shifting the first noise according to the motion indicated by the extracted motion information.

5. The moving picture processing method according to claim 4,
wherein the moving picture signal is coded, said method further comprises
decoding the coded moving picture signal, and
said specifying of the superimposition area includes sequentially specifying the superimposition area in each of current pictures to be processed which is included in the decoded moving picture signal.

6. The moving picture processing method according to claim 5,
wherein the moving picture signal further includes first identification information indicating the superimposition area, and
said specifying of the superimposition area includes specifying the superimposition area based on the first identification information.

7. The moving picture processing method according to claim 5,
wherein the moving picture signal further includes second identification information indicating an area on which the first noise is to be superimposed within the superimposition area, and
said superimposing of the shifted first noise includes superimposing the shifted first noise on the area indicated by the second identification information.

8. The moving picture processing method according to claim 5,
wherein the moving picture signal further includes an adjustment signal indicating the level of the noise to be superimposed, and
said superimposing of the shifted first noise includes adjusting the first noise so that the level of the shifted first noise becomes equal to the level indicated by the adjustment signal, and superimposing the adjusted first noise on the superimposition area.

9. The moving picture processing method according to claim 1, further comprising:
judging whether or not switching of image has occurred between the current picture included in the moving picture and a processed picture;
newly generating a second noise which has not been used for superimposition and superimposing the generated second noise on the current picture in the case where it is judged that the switching has occurred; and
superimposing the shifted first noise on the superimposition area in the case where it is judged that the switching has not occurred.

10. The moving picture processing method according to claim 9,
wherein said judging includes
generating the second noise and superimposing the generated second noise on the current picture in the case where it is judged that the switching has occurred, the second noise being of a type which is in accordance with a characteristic of the current picture.

11. The moving picture processing method according to claim 1,
wherein said superimposing of the shifted first noise includes
adjusting the level of the shifted first noise and superimposing the adjusted first noise on the superimposition area.

12. The moving picture processing method according to claim 11,
said adjusting of the level of the shifted first noise includes adjusting the level of the shifted first noise so that the higher the frequency components included in the superimposition area are, the higher the level of the shifted first noise becomes.

13. A moving picture processing apparatus which superimposes noise on a moving picture, said apparatus comprising:
- a motion compensation unit operable to shift a first noise which has been used for superimposition on a moving picture, in accordance with a motion of the moving picture;
- a superimposition unit operable to superimpose the shifted first noise onto a moving picture that appears after the motion has occurred; and
- an area specification unit operable to specify a superimposition area, on which noise is to be superimposed, in a current picture to be processed which is included in the moving picture,
- wherein said motion compensation unit is operable to shift the first noise in accordance with a motion of an image in the superimposition area, and
- said superimposition unit is operable to superimpose the shifted first noise onto the superimposition area.

14. A non-transitory computer-readable medium having a program stored thereon for superimposing noise on a moving picture, the program causing a computer to execute:
- shifting a first noise which has been used for superimposition on a moving picture, in accordance with a motion of the moving picture;
- superimposing the shifted first noise onto a moving picture that appears after the motion has occurred; and
- specifying a superimposition area, on which noise is to be superimposed, in a current picture to be processed which is included in the moving picture,
- wherein the shifting of the first noise includes
- shifting the first noise in accordance with a motion of an image in the superimposition area, and
- the superimposing of the shifted first noise includes
- superimposing the shifted first noise onto the superimposition area.

15. An integrated circuit which superimposes noise on one of moving pictures, said circuit comprising:
- a motion compensation unit operable to shift a first noise which has been used for superimposition on a moving picture, in accordance with a motion of the moving picture;
- a superimposition unit operable to superimpose the shifted first noise onto a moving picture that appears after the motion has occurred; and
- an area specification unit operable to specify a superimposition area, on which noise is to be superimposed, in a current picture to be processed which is included in the moving picture,
- wherein said motion compensation unit is operable to shift the first noise in accordance with a motion of an image in the superimposition area, and
- said superimposition unit is operable to superimpose the shifted first noise onto the superimposition area.

* * * * *